US009280586B1

(12) United States Patent  
McArdle

(10) Patent No.: US 9,280,586 B1  
(45) Date of Patent: Mar. 8, 2016

(54) ELECTRONIC DATABASE FOR ATHLETES AND COACHES FOR RECRUITING PURPOSES

(71) Applicant: LookForIt, LLC, Lake Forest, IL (US)

(72) Inventor: John McArdle, Lake Bluff, IL (US)

(73) Assignee: LookForIt, LLC, Lake Forest, IL (US)

( * ) Notice: Subject to any disclaimer, the term of this patent is extended or adjusted under 35 U.S.C. 154(b) by 182 days.

(21) Appl. No.: 13/773,814

(22) Filed: Feb. 22, 2013

Related U.S. Application Data

(60) Provisional application No. 61/601,810, filed on Feb. 22, 2012.

(51) Int. Cl.  
*G06F 17/30* (2006.01)

(52) U.S. Cl.  
CPC .................................. *G06F 17/3053* (2013.01)

(58) Field of Classification Search  
CPC .............. G06F 17/30864; G06F 17/30991; G06F 17/30867; G06F 17/3053; G06Q 50/2053; A63B 2024/0068  
USPC ........................................................ 707/723  
See application file for complete search history.

(56) References Cited

U.S. PATENT DOCUMENTS

| | | | | |
|---|---|---|---|---|
| 2007/0250291 | A1* | 10/2007 | Beale | 702/182 |
| 2009/0187473 | A1* | 7/2009 | Blaze et al. | 705/10 |
| 2009/0258710 | A1* | 10/2009 | Quatrochi et al. | 463/43 |
| 2010/0030350 | A1* | 2/2010 | House et al. | 700/91 |
| 2010/0129780 | A1* | 5/2010 | Homsi et al. | 434/258 |
| 2011/0306427 | A1* | 12/2011 | Pawson | 463/42 |
| 2012/0120771 | A1* | 5/2012 | Lapides | 368/10 |
| 2012/0179277 | A1* | 7/2012 | Lymberopoulos | 700/91 |
| 2013/0224708 | A1* | 8/2013 | Martin | G09B 19/0038 434/247 |

\* cited by examiner

*Primary Examiner* — Scott A Waldron  
*Assistant Examiner* — Dongming Wang  
(74) *Attorney, Agent, or Firm* — Woodard, Emhardt, Moriarty, McNett & Henry LLP

(57) ABSTRACT

Disclosed in an electronic database which enables athletes to see a dynamic list of colleges where the athlete's specific sports times would qualify them to compete. As the athlete's times improve over the course of their high school career, the list of colleges changes as more and more colleges become candidates for the athlete. The athletes can easily communicate their times to the college coaches, and monitor the status of schools of interest. Likewise, high schools and clubs can also assist students in the college search process given access to the same data as the athletes. College coaches can also have access to the athlete times and other recruiting information, and can customize their search so that athletes meeting the college recruiting guidelines (i.e. minimum times in specific events, grade point average of athlete, etc) are highlighted across the sea of recruits, while those not meeting the recruiting guidelines can be ignored.

23 Claims, 22 Drawing Sheets

ATHLETE INPUT - Figure 1

Best Times — 101

| Event | SCY Date | SCY Time | LCM Date | LCM Time |
|---|---|---|---|---|
| 50 Free | 7/24/2010 | 0:26.85 | 5/25/2011 | 0:31.03 |
| 100 Free | 10/20/2011 | 0:56.65 | 7/21/2011 | 1:03.43 |
| 200 Free | 11/6/2010 | 2:01.77 | 6/25/2010 | 2:24.96 |
| 500/400 Free | 10/7/2010 | 5:28.38 | 6/26/2010 | 4:57.95 |
| 1000/800 Free | 7/23/2010 | 11:12.43 | 5/22/2011 | 10:04.31 |
| 1650 Free | | | | |
| 100 Breast | 11/12/2011 | 1:05.98 | 7/23/2011 | 1:18.55 |
| 200 Breast | 12/4/2011 | 2:31.04 | 7/16/2011 | 2:49.44 |
| 100 Fly | | | | |
| 200 Fly | 12/4/2011 | 2:23.55 | | |
| 100 Back | 7/25/2010 | 1:03.83 | 7/3/2010 | 1:15.26 |
| 200 Back | 7/24/2010 | 2:16.07 | 7/2/2010 | 2:42.27 |
| 200 IM | 11/5/2011 | 2:10.28 | 7/22/2011 | 2:31.44 |
| 400 IM | 10/8/2011 | 4:45.40 | | |

102
103

Note: only SCY times are used for searches
Click on Time to see progress over time Coach:    HS/Club    Splash Note: keep history of time changes and dates for Athlete Progress Reporting LockForIt Preferences — 105

Preferred Communication    Email [and/or] Text, Facebook
Limit Displays to These Divisions    I, II, III, NAIA, NJCAA
Limit Displays to These States/Regions    [List]

☐ Check here if you would like to receive special offers from our business partners 106
107

Information for Coaches — 104

Birthdate:    12/10/1994
Address:    1175 Arbor Court, Lake Bluff, IL 60044
Contact Phone:    (847) 735-8483    [home, cell]
Parents Phone:    (847) 735-8483    Jack and Andrea
Contact Email:    annemcardle@lockforit.com
Parents Email:    jackmcardel@aol.com
High School:    Lake Forest High School, Lake Forest, IL
HS Coach/Contact:    Carolyn Grevers    (847) 234-5555
HS Graduation Yr:    2013
Club:    Lake Forest Swim Club, Lake Forest, IL
Club Coach/Contact:    Mo Sheehan    (847) 858-4924
Class Rank/Size:    out of
GPA/Scale:    3.0 on scale of    4.0
ACT:    SAT:
Intended Major:
Height:    5'6"    Weight:    130
Other Things the Coach Should Know:

Elite Input — 109

Picture:
List of Conferences to Track:    B10, ACC, MAC
Exclude Colleges if:    Exclude Events/Strokes in Dash
   Enrollment    a
           b
   Times    c

108 also if x seconds faster than 1, 2 or 3 time in given stroke — 110

Admin View

Free Membership Start:    End:
Elite Membership Start:    End:
Elite Annual Subscription:
Credit Card:    Exp:    Code
Username:    Password:

Anne McArdle

ATHLETE PARAMETERS - Figure 2
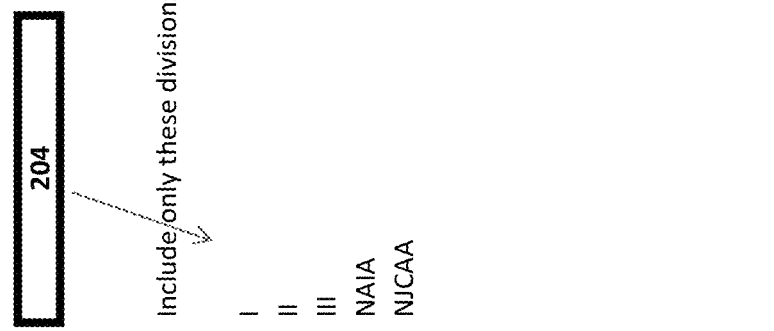
Color for #1
Color for #2
Color for #3
Color for Close
Dashboard Filters
| | Close Parameter | Show/Don't Show in Views (Default to Y) |
|---|---|---|
| 50 Free | 0:00.50 | Y/N |
| 100 Free | 0:01.00 | Y/N |
| 200 Free | 0:02.00 | Y/N |
| 500 Free | 0:05.00 | Y/N |
| 1000 Free | 0:10.00 | Y/N |
| 1650 Free | 0:16.50 | Y/N |
| 100 Breast | 0:01.00 | Y/N |
| 200 Breast | 0:02.00 | Y/N |
| 100 Fly | 0:01.00 | Y/N |
| 200 Fly | 0:02.00 | Y/N |
| 100 Back | 0:01.00 | Y/N |
| 200 Back | 0:02.00 | Y/N |
| 200 IM | 0:02.00 | Y/N |
| 400 IM | 0:04.00 | Y/N |
Include only these divisions:
I
II
III
NAIA
NJCAA

QUICK SEARCH - Figure 3

FIND COLLEGES THAT MIGHT BE INTERESTED IN YOU AS A SWIMMER

| | | Divisions to Include: | | 2/21/2013 |
|---|---|---|---|---|
| Name: | Anne McArdle | | x | I |
| Gender: | Female | | x | II |
| | | | x | III |
| Event: | 100 Breast (from pick list) | | | NAIC |
| Time (SCY): | 1:05.98 | | | NJCAA |

302
301

100 Breast time of 1:05.98 would be AAA Time

| | Division I | Division II | Division III |
|---|---|---|---|
| #1 at: | Radford University | Florida Southern College | Augustana College |
| | Sacred Heart University | Hillsdale College | Carthage College |
| | Saint Francis University | Limestone College | Illinois Wesleyan |
| | Saint Louis University | Northern Michigan University | Lake Forest College |
| | Siena College | Rollins College | Principia College |
| | St Bonaventure | University of Tampa | |
| | St Francis College | | |
| | Stony Brook University | | |
| | US Air Force Acadamy | | |
| | US Military Acadamy | | |
| | University of Akron | | |
| | University of Arkansas, Little Rock | | |
| #2 at: | Rice University | | |
| | Seton Hall University | | |
| | Southern Methodist University | | |
| | US Naval Acadamy | | |
| | University at Buffalo, The State University of NY | | |
| #3 at: | Purdue University | | Kenyon College |
| | San Jose State University | | |
| | Seattle University | | |
| | Southern Illinois University at Carbondale | | |
| | Texas Christian University | | |
| Close at: | University of Arkansas, Fayetteville | | |

306 → #1 at
305 → #2 at
304 → #3 at
303 → Close at

Go to WWW.LOOKFORIT.COM to sign up for access - IT'S FREE!

SEARCH FOR COLLEGES MEETING THIS CRITERIA: - Figure 4

| Division | Times Search | Located in These States [or Regions] | Enrollment | | | Tuition | | | With Special Programs |
|---|---|---|---|---|---|---|---|---|---|
| I | [100 Breast] = close or better | [IL] | Between | 2,500 | | Between | 10,000 | | Enhanced Disability Services |
| [II] | [and/or] | [IN] | and | 30,000 | | and | 30,000 | | [and/or] |
| [III] | [any other] = close or better | [NY] | | | | | | | No/Low ACT/SAT |
| [NAIA] | | [TX] | | | | | | | |
| [NJCAA] | Exclude if [100 Breast] more than 4 seconds better than [#1] college time | | | | | | | | |

RESULTS AS OF 2/21/2013

| | | Rice University | Southern Illinois | Stony Brook |
|---|---|---|---|---|
| College | | | | |
| State | | TX | IL | NY |
| Division | | I | I | I |
| Enrollment | | 2,728 | 13,000 | 16,000 |
| Tuition | | | | |
| Program | | | Achieve | |
| My Times | | | | |
| 0:26.85 | 50 Free | 0:23.71 | 0:25.75 | 0:25.90 |
| 0:56.65 | 100 Free | 0:51.90 | 0:55.98 | 0:56.57 |
| 2:01.77 | 200 Free | 1:51.41 | 2:00.33 | |
| 5:28.38 | 500 Free | 4:56.63 | 5:09.50 | |
| 11:12.43 | 1000 Free | 10:13.15 | 10:08.56 | |
| | 1650 Free | 16:53.30 | 18:09.16 | |
| 1:05.98 | 100 Breast | 1:05.60 | | |
| 2:31.04 | 200 Breast | 2:22.31 | 2:26.60 | |
| | 100 Fly | 0:56.58 | | 1:01.13 |
| | 200 Fly | 2:05.19 | 2:14.49 | 2:18.07 |
| 1:03.83 | 100 Back | 0:58.59 | | 1:02.97 |
| 2:16.07 | 200 Back | 2:02.24 | 2:06.49 | 2:15.14 |
| 2:10.28 | 200 IM | 2:05.51 | | |
| 4:45.40 | 400 IM | 4:24.70 | | |
| | Move to Watch List | Y | Y | N |

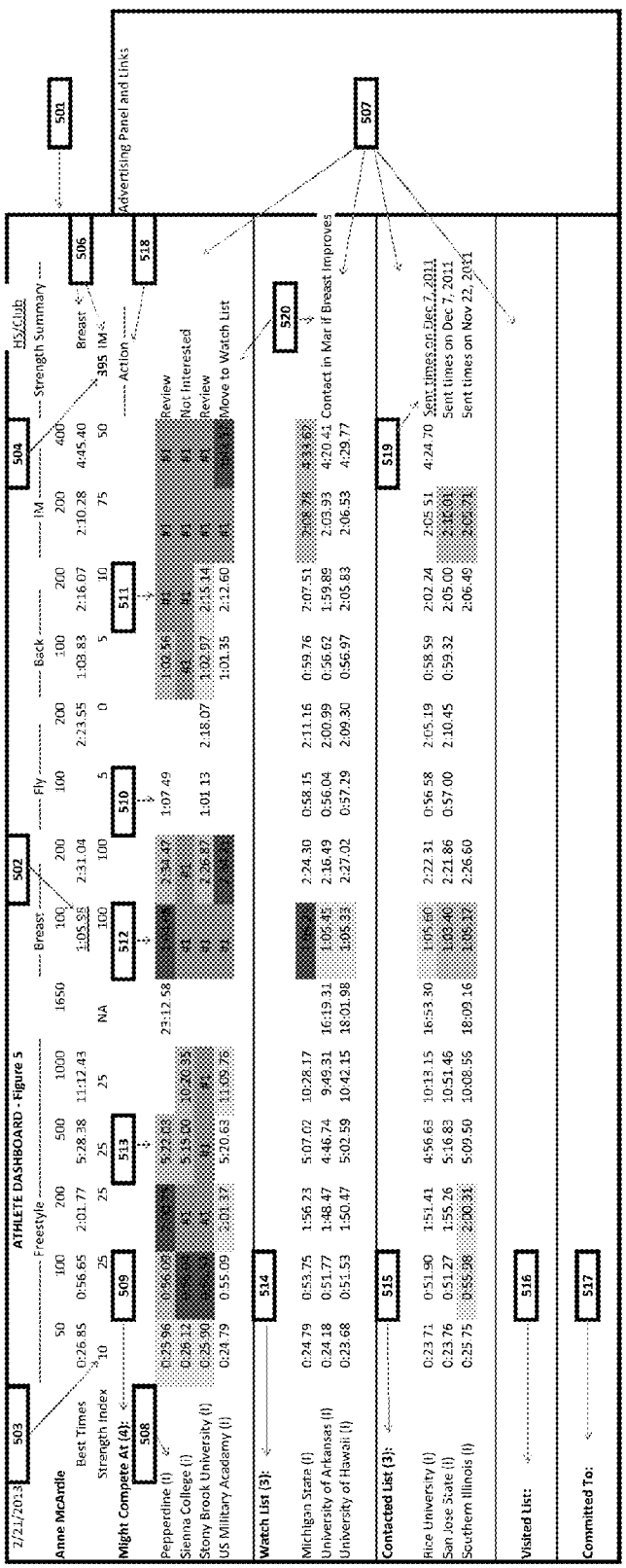

ELITE ATHLETE DASHBOARD - Figure 6

| 2/21/2013 | | | | | | | | | | | | | | | | | | | | |
|---|---|---|---|---|---|---|---|---|---|---|---|---|---|---|---|---|---|---|---|---|
| Anne McArdle ('13) IL | | ----- Freestyle ----- | | | | | | ----- Breast ----- | | | ----- Fly ----- | | | ----- Back ----- | | | ----- IM ----- | | | Strength Summary |
| | | 50 | 100 | 200 | 500 | 1000 | 1650 | 100 | 200 | | 100 | 200 | | 100 | 200 | | 200 | 400 | | |
| Best Times | | 0:26.85 | 0:56.65 | 2:01.77 | 5:28.36 | 11:12.43 | NA | 1:05.98 | 2:31.04 | | 2:23.55 | | | 1:03.83 | 2:15.07 | | 2:10.28 | 4:45.40 | | Breast |
| Strength Index | | 10 | 25 | 25 | 25 | 25 | | 100 | 100 | | 0 | | | 5 | 10 | | 75 | 50 | | 455 IM |
| | | | | | | | | | | | | | | | | | | | | Coach |

| | | | | | | | | | | | |
|---|---|---|---|---|---|---|---|---|---|---|---|
| Lane 1 | A | | | | | | | | | | |
| Lane 2 | AA | 0:00.26 | | | | | | | | | |
| Lane 3 | AAA | | 0:01.76 | 0:03.08 | 0:12.19 | 0:18.24 | | | | 0:02.46 | | | 0:00.44 | 0:05.28 | 0:01.51 |
| Lane 4 | Jr Nat | | | | | | | | 0:00.07 | 0:08.36 | 0:14.26 | | | | | 0:03.09 |
| Lane 5 | AAAA | | | | | | | | | 0:20.06 | | | | | |
| Lane 6 | National | | | | | | | 0:00.10 | | | | | | | |
| Lane 7 | NCAA B Cut | | | | | | | 0:03.00 | | | | | | | |
| Lane 8 | NCAA A Cut | | | | | | | 0:06.33 | | | | | | | |
| Lane 9 | Olympic Trial | | | | | | | | | | | | | | |
| Lane 10 | Olympics | | | | | | | | | | | | | | |

601

603 Advertising Panel and Links

602

604

Body of dashboard is in the format of a 10 lane pool. As goals are achieved, the cells display the water in the pool. Lane lines are the separators of the rows.
If a level is achieved, color turns to blue and date (if available) is placed in the cell
Date is the date the swimmer first achieved the level
Time is the improvement needed to make the higher level

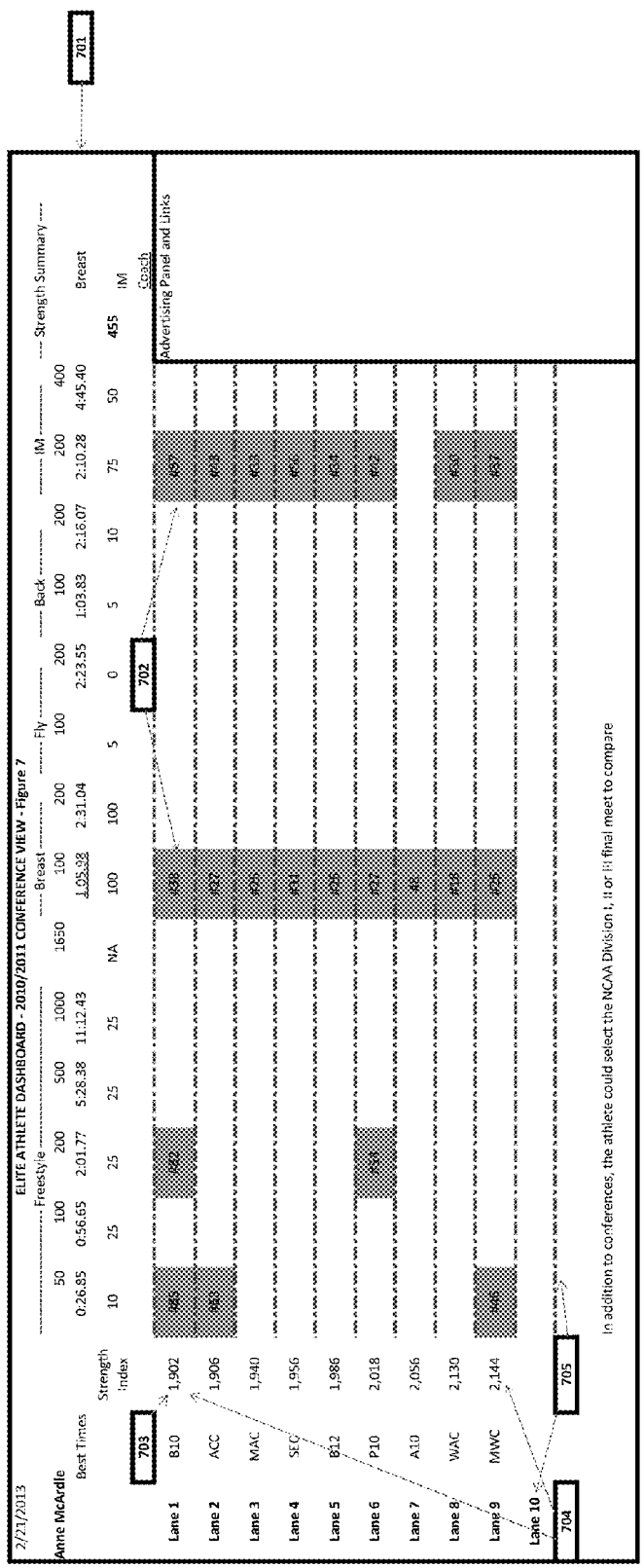

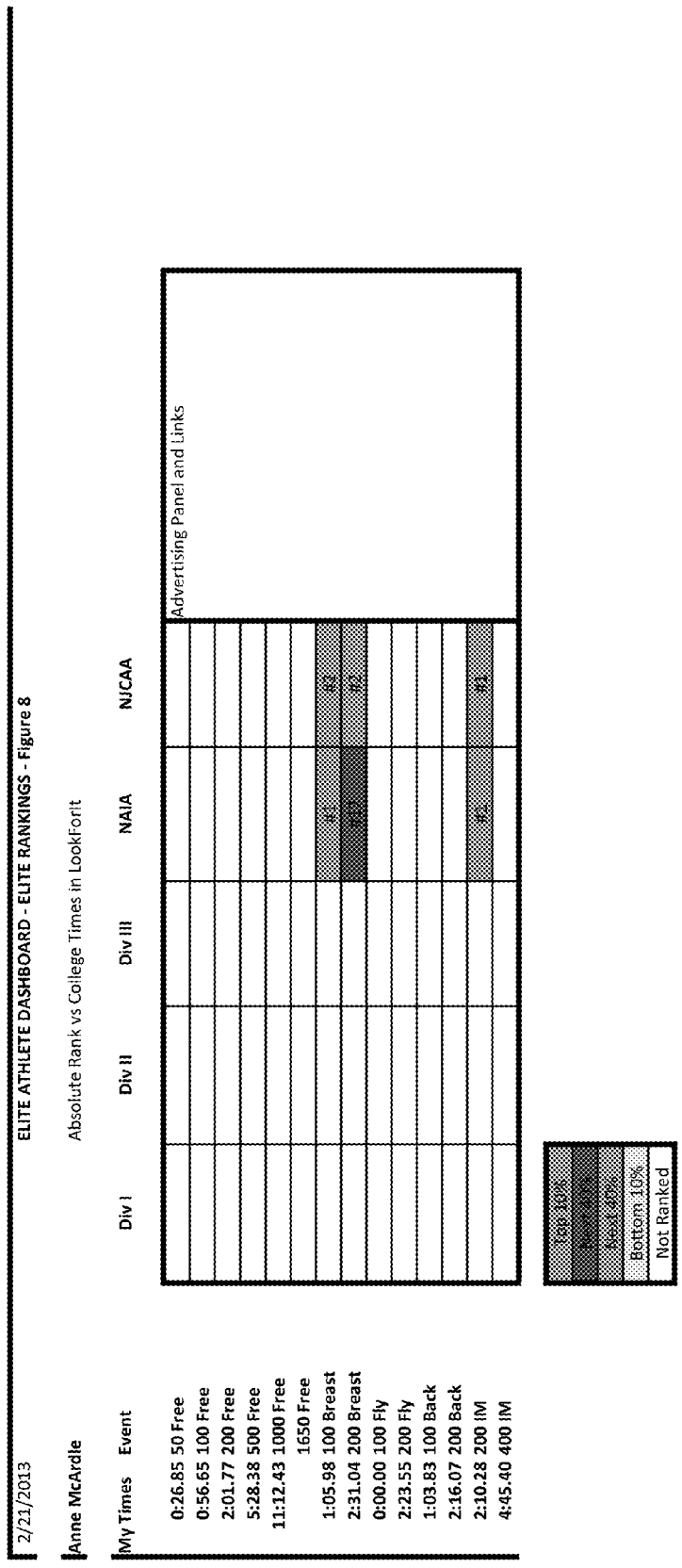

| 2/21/2013 | ELITE ATHLETE DASHBOARD - SUMMARY - Figure 9 | | | | | | | Advertising Panel and Links |
|---|---|---|---|---|---|---|---|---|
| Anne McArdle | Include college if my times would be in | [top 3] | | [Parameter for Top [1, 2 or 3] | | | | |
| | College Swimming Indicators: | Total | Div I | Div II | Div III | NAIA | NJCAA | |
| | In Top [3] (in at least 1 event) | 0 | | | | | | |
| | In Top [3] (in at least 2 events) | 0 | | | | | | |
| | In Top [3] (in at least 3 events) | 0 | | | | | | |
| | In Top [3] (in at least 4 events) | 0 | Clicking in this section will bring up the colleges that meet the criteria (the college line or lines from Athlete Dashboard - Might Swim At) | | | | | |
| | In Top [3] (in at least 5 events) | 0 | | | | | | |
| | In Top [3] (in at least 6 events) | 0 | | | | | | |
| | In Top [3] (in at least 7 events) | 0 | | | | | | |
| | In Top [3] (in at least 2 strokes) | 0 | | | | | | |
| | In Top [3] (in at least 3 strokes) | 0 | | | | | | |
| | In Top [3] (in at least 4 strokes) | 0 | | | | | | |
| | In Top [3] (in at least 5 strokes) | 0 | | | | | | |
| | College Coaches Looking At You: | | | | | | | |
| | Received Your Information: | 0 | Clicking in this section will not bring up any more detail | | | | | |
| | Meets Recruiting Guidelines: | 0 | | | | | | |
| | On Coach's Watch List: | 0 | | | | | | |

Event - for example, 100 breast and 200 breast are each an event
Stroke - for example, 100 breast and 200 breast are together only one stroke (breast)

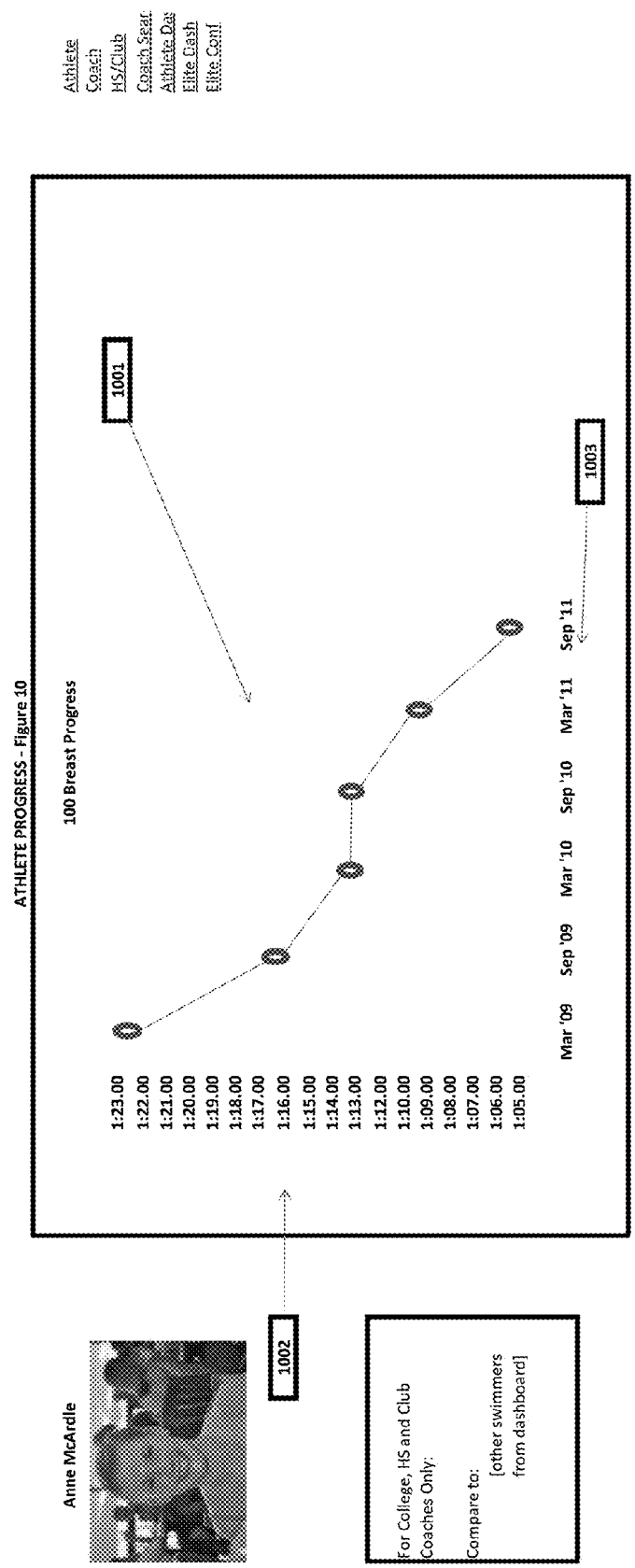

ATHLETE SUMMARY - Figure 11

Anne McArdle
2/23/2013

Athlete
BS/Club

100 Breast time of    1:05.98 would be

| | W/C | Division I (26) | W/C | Division II (9) | W/C | Division III (24) | W/C | NAIA (6) | W/C | NJCAA (0) |
|---|---|---|---|---|---|---|---|---|---|---|
| #1 at: | | Boston College | | Adelphi University | | Albion College | | Asbury University | | |
| | | Brown University | | Colorado School of Mines | | Albright College | | Azusa Pacific University | | |
| | | Butler University | | Florida Southern College | | Allegheny College | | Biola University | | |
| | | Drexel University | | Gannon University | | Alma College | | College of Idaho | | |
| | | Duquesne University | | Hillsdale College | | Amherst College | | Savannah College of Art | | |
| | | Eastern Illinois University | | Limestone College | | Augsburg College | | University of the Cumberlands | | |
| | | Fairfield University | | Northern Michigan University | | Augustana College | | | | |
| | | Fordham University | | Rollins College | | Baldwin-Wallace College | | | | |
| | | Georgetown University | | University of Tampa | | Baruch College | | | | |
| | | Illinois State University | | | | Bates College | | | | |
| | | Niagara University | | | | Brandeis University | | | | |
| | | Northern Arizona University | | | | Bridgewater College | | | | |
| | | Providence College | | | | Carroll University | | | | |
| | | Radford University | | | | Carthage College | | | | |
| | | Sacred Heart University | | | | Denison University | | | | |
| | | Saint Francis University | | | | Hope College | | | | |
| | | Saint Louis University | | | | Illinois Wesleyan | | | | |
| | | Siena College | | | | John Carroll University | | | | |
| | | St Bonaventure | | | | King's College | | | | |
| | | St Francis College | | | | Lake Forest College | | | | |
| | | Stony Brook University | | | | Loras College | | | | |
| | | US Air Force Academy | | | | McDaniel College | | | | |
| | | US Military Academy | | | | Principia College | | | | |
| | | University of Akron | | | | University of WI - Oshkosh | | | | |
| | | University of Arkansas, Little Rock | | | | | | | | |
| | | University of Maine | | | | | | | | |
| #2 at: | | Boise State University | | Grand Canyon University | | Depauw University | | California Baptist | | |
| | | Bucknell University | | Grand Valley State University | | | | Concordia University | | |
| | | Georgia Southern University | | | | | | Fresno Pacific University | | |
| | | Loyola Marymount University | | | | | | | | |
| | | Pepperdine University | | | | | | | | |
| | C | Rice University | | | | | | | | |
| | | Seton Hall University | | | | | | | | |
| | | Southern Methodist University | | | | | | | | |
| | | US Naval Academy | | | | | | | | |
| | | University at Buffalo, The State University of NY | | | | | | | | |
| | | University of Delaware | | | | | | | | |
| #3 at: | | Ball State University | | | | Kenyon College | | | | |
| | W | Michigan State University | | | | | | | | |
| | | North Carolina State University | | | | | | | | |
| | | Oakland University | | | | | | | | |
| | | Purdue University | | | | | | | | |
| | C | San Jose State University | | | | | | | | |
| | | Seattle University | | | | | | | | |
| | C | Southern Illinois University at Carbondale | | | | | | | | |
| | | Texas Christian University | | | | | | | | |
| | | University of California, Santa Barbara | | | | | | | | |
| | | University of Denver | | | | | | | | |
| | | University of Iowa | | | | | | | | |
| | | | | Minnesota State University | | | | | | |
| Close at: | | Auburn University | | | | | | | | |
| | | College of William and Mary | | | | | | | | |
| | | Northeastern University | | | | | | | | |
| | | Northwestern University | | | | | | | | |
| | | Ohio University | | | | | | | | |
| | W | University of Arkansas, Fayetteville | | | | | | | | |
| | | University of Connecticut | | | | | | | | |
| | W | University of Hawaii at Manoa | | | | | | | | |
| | | University of Kansas | | | | | | | | |

200 IM time of    2:10.28 would be

| | W/C | Division I | W/C | Division II | W/C | Division III | W/C | NAIA |
|---|---|---|---|---|---|---|---|---|
| #1 at: | | Boston College | | Adelphi University | | Augustana College | | Azusa Pacific University |
| | | Butler University | | Colorado School of Mines | | Bowdoin College | | College of Idaho |
| | | Drexel University | | Florida Southern College | | Bridgewater College | | Savannah College of Art |
| | | Eastern Illinois University | | Gannon University | | Carroll University | | University of the Cumberlands |
| | | Fairfield University | | Grand Valley State University | | Illinois Wesleyan | | |
| | | Georgetown University | | Hillsdale College | | John Carroll University | | |
| | | Georgia Southern University | | Limestone College | | Kalamazoo College | | |
| | | Loyola Marymount University | | Northern Michigan University | | King's College | | |
| | | Niagara University | | Rollins College | | Lake Forest College | | |
| | | Pepperdine University | | | | Loras College | | |
| | | Providence College | | | | McDaniel College | | |
| | | Sacred Heart University | | | | Principia College | | |
| | | Siena College | | | | University of WI - Oshkosh | | |
| | | St Bonaventure | | | | | | |
| | | St Francis College | | | | | | |
| | | Stony Brook University | | | | | | |
| | | US Military Academy | | | | | | |
| | | University of Maine | | | | | | |
| #2 at: | | Northern Arizona University | | | | Brandeis University | | Fresno Pacific University |
| | | Saint Francis University | | | | Depauw University | | |
| | | Saint Louis University | | | | | | |
| | | University of Akron | | | | | | |
| | | University of Delaware | | | | | | |
| #3 at: | | Boise State University | | Minnesota State University | | | | |
| | | Duquesne University | | | | | | |
| | | Fordham University | | | | | | |
| | | Michigan State University | | | | | | |
| | | Oakland University | | | | | | |
| | | San Jose State University | | | | | | |
| | | Seattle University | | | | | | |
| | | Seton Hall University | | | | | | |
| | | Southern Illinois University at Carbondale | | | | | | |
| | | US Air Force Academy | | | | | | |
| Close at: | | Bucknell University | | Grand Canyon University | | | | |
| | | Illinois State University | | University of Tampa | | | | |
| | | Purdue University | | | | | | |
| | | University of Connecticut | | | | | | |

HIGH SCHOOL/CLUB INPUT - Figure 12

Lake Forest Swim Club      [high school or club]

| | | email |
|---|---|---|
| Coach: | Maureen Sheehan | coachmosheehan@sbcglobal.net |
| Assistant Coach: | Michael Lawrence | coachmdl@sbcglobal.net |
| Assistant Coach: | Laurel Liberty | coachlaurel@sbcglobal.net |
| Contact Address: | 555 North Sheridan Rd | |
| | Lake Forest, IL 60045 | |
| Web Site: | www.swimlfsc.org | |
| Contact Phone: | (847) 735-5372 | 1201 |

Squads: Ducks     [or Varsity/Junior Varsity for high school]
         Yellow
         Green
         [color]    1202
         Senior
         National

| Team Members | Birthdate | Gender | HS Grad Yr | Squad |
|---|---|---|---|---|
| Gottschalk, Amanda | | F | 2013 | Senior |
| Gottschalk, Laura | | F | 2015 | Senior |
| McArdle, Anne | 12/10/1994 | F | 2013 | Senior |
| Sabalasky, Mary Claire | | F | 2014 | Senior |
| Stoehr, Rachel | | F | 2012 | National |

1203

Needs edit to insure that person is really coach of this team
Colors may be selected by coach - these colors will show up on HS-Club Dashboard Admin View

| Membership Start: | End: | Type: [HS or Club] |
|---|---|---|
| Products: | Wswim | Mswim |
| Base Annual Subscription: | | |
| HS/Club Users: | | |
|    Username 1 | Password 1 | Start/End |
|    Username 2 | Password 2 | Start/End |
| Team: | | |
|    Name 1 | Claim Code 1 | Start/End |
|    Name 2 | Claim Code 2 | Start/End |
| Credit Card: | Exp: | Code |

Note: Claim code is used in the case the HS/Club initially sets up the athlete information and the athlete later wants to "claim it" and take over maintenance of times and access the system. Unless "claimed", access to athlete info is only accessible to HS/Club and college coaches

DASHBOARD - LAKE FOREST SWIM CLUB - SCY [or LCM] - Figure 13

2/21/2013 — 1302

1305 → Advertising Panel and Links 1301, 1312 → Dashboard Summary (x4)

| Girl's | Strength | 50 | 100 | 200 | Freestyle 500 | 1000 | 1650 | 100 | Breast 200 | 100 | Fly 200 | 100 | Back 200 | 200 | IM 400 |
|---|---|---|---|---|---|---|---|---|---|---|---|---|---|---|---|
| High School State Cut — 1306 | | 0:24.84 | 0:53.99 | 1:56.20 | 5:12.28 | NA | NA | 1:08.40 | NA | 0:59.40 | NA | 0:59.92 | NA | 2:11.68 | NA |
| Yellow (1) — 1307 | | | | | | | | | | | | | | | |
| King, Mary Grace ('20) | 0 | 0:45.80 | 1:43.40 | 3:00.30 | 7:12.32 | | | 1:34.40 | 3:22.20 | 1:33.50 | 2:50.30 | 1:20.60 | 3:01.20 | 2:53.30 | 6:00.20 |
| Green (2) — 1307 | | | | | | | | | | | | | | | |
| Bedward, Emma ('18) | 8 | 0:35.40 | 1:21.20 | 2:23.30 | 5:45.30 | 12:34.50 | | 1:30.30 | 3:08.40 | 1:22.30 | 2:35.40 | 1:17.44 | 2:37.70 | 2:32.20 | 5:33.33 |
| Smith, Jane ('18) | 8 | 0:36.00 | 1:10.40 | 2:20.50 | 6:00.01 | 12:45.60 | | 1:24.30 | 3:05.60 | 1:20.40 | 2:40.50 | 1:14.45 | 2:40.70 | 2:44.40 | 5:55.55 |
| Terkildsen, Catherine | 10 | 0:35.40 | 1:21.20 | 2:23.30 | 5:45.30 | 12:34.50 | | 1:30.30 | 3:08.40 | 1:22.30 | 2:35.40 | 1:17.44 | 2:37.70 | 2:32.20 | 5:33.33 |
| Bronze (1) — 1307 | | | | | | | | | | | | | | | |
| Manning, Anna ('16) | 40 | 0:31.30 | 1:07.50 | 2:12.22 | 5:44.40 | 12:22.22 | | 1:20.40 | 3:03.30 | 1:18.88 | 2:41.10 | 1:10.40 | 2:26.66 | 2:31.40 | 5:27.70 |
| Senior (4) — 1307 | | | | | | | | | | | | | | | |
| Gottschalk, Amanda ('13) | 98 | 0:28.24 | | | | | | 1:08.80 | | 1:11.61 | 2:33.01 | | 2:11.03 | 2:12.50 | 4:42.86 |
| Gottschalk, Laura ('15) | 86 | | | | | 12:03.56 — 1311 | | 1:24.47 | 2:59.31 | 1:05.87 | 2:23.73 | | | | |
| McArdle, Anne ('13) | 395 | | | | | | | 1:06.98 | | | 2:23.55 | | | 2:10.28 | |
| Sabalasky, Mary Claire ( ) | 81 | 0:28.55 | | | | 12:03.56 | | 1:16.34 | 2:47.34 | 1:06.30 | 2:27.74 | | 2:25.43 | | |
| National (1) — 1307 | | | | | | | | | | | | | | | |
| Stoehr, Rachel ('12) | 212 | | 0:52.44 | 1:49.16 | 4:49.32 | 10:13.22 | 17:30.30 | | | | | | | | |

1303, 1304, 1308, 1309, 1310

Click on name to see athlete details (Athlete Input)

Colors = Cut Standards (AAAA, AAA, AA, etc or state qualifying times) for club or HS

COACH INPUT Figure 14
Rice University

| | |
|---|---|
| Coach Name: | Seth Huston  ← 1401 |
| Coach Contact Address: | Rice Athletics |
| | MS 548 |
| | PO Box 1892 |
| | Houston, TX 77251 - 1892 |
| | |
| Coach eMail: | shuston@rice.edu |
| Coach Phone Number: | (555) 555-5555 |

Coach will [will not] update with current season times      1403  1404  1405

|  | ----- Top Three Times -------- | | | --- Recruiting Standards --- | | |
|---|---|---|---|---|---|---|
|  | A Cut  Season: 2011/2012 | | | Interest | Close | Cutoff |
|  | B Cut | | | | | |
| 50 Free | 0:23.71 | 0:24.15 | 0:24.38 | 0:24.50 | 0:25.00 | 0:22.00 |
| 100 Free | 0:51.69 | 0:51.91 | 0:53.06 | 0:54.00 | 0:57.00 | 0:50.00 |
| 200 Free | 1:50.34 | 1:50.56 | 1:52.67 | 1:54.00 | 1:57.00 | 1:48.00 |
| 500 Free | 4:58.39 | 5:00.17 | 5:04.53 | 5:03.00 | 5:07.00 | 4:52.00 |
| 1000 Free | 10:12.48 | 10:17.57 | 10:18.12 | 10:15.00 | 10:20.00 | 10:00.00 |
| 1650 Free | 16:54.40 | 16:57.47 | 17:00.92 | 17:00.00 | 17:25.00 | 16:45.00 |
| 100 Breast | 1:05.32 | 1:06.02 | 1:06.20 | 1:06.50 | 1:08.50 | 1:02.00 |
| 200 Breast | 2:21.97 | 2:22.51 | 2:23.61 | 2:24.00 | 2:27.00 | 2:16.00 |
| 100 Fly | 0:56.37 | 0:56.62 | 0:56.64 | 0:57.00 | 0:59.00 | 0:54.00 |
| 200 Fly | 2:03.11 | 2:04.34 | 2:09.04 | 2:06.00 | 2:10.00 | 1:58.00 |
| 100 Back | 0:57.22 | 0:57.58 | 0:58.88 | 0:59.00 | 1:00.00 | 0:55.00 |
| 200 Back | 2:03.51 | 2:04.13 | 2:04.52 | 2:05.00 | 2:07.00 | 1:58.00 |
| 200 IM | 2:05.08 | 2:05.16 | 2:09.46 | 2:10.00 | 2:12.00 | 2:00.00 |
| 400 IM | 4:22.57 | 4:24.59 | 4:33.44 | 4:30.00 | 4:40.00 | 4:15.00 |

Additional Recruiting Standards:   1402

1406

| | | | | | |
|---|---|---|---|---|---|
| States: | TX | AZ | NM | OK | LA |
| GPA: | 3.00 on | | 4.00 scale | or | |
| | 4.00 on | | 5.00 scale | | |
| Birthdate: | After | 9/1/1994 | | | |
| Grad Yr: | 2012 or | | | | |
| | 2013 | | | | |

Needs edit to insure that person is really coach of this team (email of password goes back to email from college address)
Colors may be selected by coach - these colors will show up on Coach Dashboard
Also consider zip code radius search as substitution for state or region search

Admin View

| | | | |
|---|---|---|---|
| Membership Start: | | End: | |
| Products: | Wswim | Mswim | |
| Base Annual Subscription: | | | |
| Coach Users: | | | |
| | Username 1 | Password 1 | Start/End |
| | Username 2 | Password 2 | Start/End |
| | | | |
| Credit Card: | | Exp: | Code |

SEARCH FOR SWIMMERS MEETING THIS CRITERIA: - Figure 15

| 1501 | | 1502 | 1503 | | 1504 | | 1505 | | | 1506 | |
|---|---|---|---|---|---|---|---|---|---|---|---|
| Event | | Time | Living in These States [or Regions] | | Graduating HS in | | With at least this [GPA] or [ACT] or [SAT] or [etc] | | | Power Index Between | |
| 1 100 Breast | | 1:06.00 | IL | | 2012 | | 3.00 on | 4.00 scale | or | | 100 and |
| 2 200 Breast | | 2:35.00 | IN | | 2013 | | 4.00 on | 5.00 scale | | | 250 |
| 3 200 IM | | 2:10.50 | MI | | | | | | | | |
| 4 400 IM | | 4:40.00 | WI | | | | | | | | |

Match if meet [3] of [4]

RESULTS AS OF DECEMBER 10, 2011

| Name | Power Index | HS Grad Year | 100 Breast Time | 200 Breast Time | 200 IM Time | 400 IM Time | State | GPA | Add to Watch List |
|---|---|---|---|---|---|---|---|---|---|
| Anne McArdle | 110 | 2013 | | | | 4:45.40 | IL | 3.10 | Yes |
| Jane Doe | 100 | 2012 | 1:10.00 | | | | MI | 3.45 | No |

Click on name to see athlete details (from Athlete Input)

2/21/2013     COACH DASHBOARD - RICE UNIVERSITY - Figure 16

Women's Swimming

| | Strength Index | 50 | 100 | 200 | 500 | 1000 | 1650 | 100 | 200 | 100 | 200 | 100 | 200 | 200 | 400 | Action |
|---|---|---|---|---|---|---|---|---|---|---|---|---|---|---|---|---|
| | | | | Freestyle | | | | Breast | | Fly | | Back | | IM | | |

Submitted Recruiting Profile (2): 1601

| Brock, Julie ('12) MO | | 0:35.40 | 1:21.20 | 2:23.30 | 5:45.30 | 12:34.50 | | 1:30.30 | 3:08.40 | 1:22.30 | 2:35.40 | 1:17.44 | 2:37.70 | 2:32.20 | 5:33.33 | Reject |
| Stevens, Jane ('13) TX | | 0:25.30 | 0:59.40 | 2:08.30 | 5:28.40 | 12:10.44 | | 1:24.30 | 3:05.60 | 1:10.33 | 2:35.00 | 1:04.44 | 2:24.44 | 2:16.48 | 4:53.31 | Review in June |

Meets Recruiting Standards (4): 1607 1602

| Able, Betty ('12) TX | 62 | 0:25.02 | | 2:02.57 | 5:33.28 | 11:23.43 | | 1:08.80 | 2:29.70 | 0:58.96 | 2:33.01 | 1:01.64 | 2:11.03 | 2:12.50 | 4:39.65 | |
| Baker, Jane ('12) NM | 67 | 0:24.97 | 0:58.64 | 2:06.06 | 5:27.43 | 12:03.56 | | 1:24.47 | 2:59.31 | 1:05.87 | 2:23.73 | 1:02.72 | 2:16.49 | 2:24.32 | 5:05.20 | |
| Cain, Sue ('13) OK | 71 | 0:28.24 | 0:57.75 | 2:02.57 | | 11:23.43 | | 1:08.80 | 2:29.70 | 0:58.30 | 2:33.01 | 1:01.64 | 2:11.03 | 2:12.50 | 4:39.65 | 1608 |
| Donahue, Mary ('12) TX | 66 | 0:24.97 | 0:58.64 | 2:06.06 | 5:27.43 | 12:03.56 | | 1:24.47 | 2:59.31 | 1:05.87 | 2:23.73 | | 2:16.49 | 2:24.32 | 5:05.20 | |

Watch List (2): 1609 1603

| McArdle, Anne ('13) IL | 395 | 0:26.85 | 0:56.65 | 2:01.77 | 5:28.38 | 11:12.43 | | | 2:31.04 | | 2:23.55 | 1:03.83 | 2:16.07 | 2:10.28 | 4:45.40 | Call on Jan 4, 10am |
| Smith, Martha ('13) IL | 72 | 0:27.00 | 0:57.20 | 2:02.21 | | | 1613 | 1:11.20 1610 | 2:47.30 | 1:02.30 | 2:13.56 | | | | | |

Contacted List (1): 1614 1604

| Stoehr, Rachel ('12) IL | 212 | | | | | | | | | | | | | | | 1615 |

Committed List: 1605

---

Click on name to see athlete details (Athlete Input)     Green = Meets Coaches Recruiting Time Standards - Interest Column
Click on time to see athlete progress     Yellow = Meets Coaches Recruiting Time Standards - Close Column
Right click on name to report all suspicious times for athlete     Red Border = Meets "B" Standard Time for Division of School (I, II or III) - see Admin MetaData
Right click on time within name to report specific suspicious time.     Black Border = Meets NCAA "A" Standard Time for Division of School (I, II or III) - see Admin MetaData Elite View

ADMIN INPUT - Figure 17

2/21/2013

| College Times | | Freestyle | | | | | Breast | | Fly | | Back | | IM | |
|---|---|---|---|---|---|---|---|---|---|---|---|---|---|---|
| | | 50 | 100 | 200 | 500 | 1000 | 1650 | 100 | 200 | 100 | 200 | 100 | 200 | 200 | 400 |
| Pepperdine (I) | 1 | 0:25.96 | 0:56.09 | 2:00.75 | 5:22.03 | | 23:12.58 | 1:04.68 | 2:34.47 | 1:07.49 | | 1:02.56 | | | |
| | 2 | | | | | | | | | | | | | | |
| | 3 | | | | | | | | | | | | | | |

Athlete Times

| | | 50 | 100 | 200 | 500 | 1000 | 1650 | 100 | 200 | 100 | 200 | 100 | 200 | 200 | 400 |
|---|---|---|---|---|---|---|---|---|---|---|---|---|---|---|---|
| McArdle, Anne (IL) | SCY | 0:26.85 | 0:56.65 | 2:01.77 | 5:28.38 | 11:12.43 | | 1:05.98 | 2:31.04 | | 2:23.55 | 1:03.83 | 2:16.07 | 2:10.28 | 4:45.40 |
| | LCM | | | | | | | | | | | | | | |

Also any other Tables, etc

2/21/2013  ADMINISTRATION DASHBOARD - Figure 18

Womens Swimming Users

| | | Total | Active | Active % | Average | Avg % | Inactive | Inactive % | | | 12/31/11 | 11/30/11 | 10/31/11 | 6/30/11 | 12/31/10 | YTD Growth | 12 mo Growth |
|---|---|---|---|---|---|---|---|---|---|---|---|---|---|---|---|---|---|
| Current Coaches | Division | | | | | | | | History Coaches | Division | | | | | | | |
| | I | 0 | | 0.0% | | 0.0% | | 0.0% | | I | | | | | | | |
| | II | 0 | | 0.0% | | 0.0% | | 0.0% | | II | | | | | | | |
| | III | 0 | | 0.0% | | 0.0% | | 0.0% | | III | | | | | | | |
| | NAIA | 0 | | 0.0% | | 0.0% | | 0.0% | | NAIA | | | | | | | |
| | NJCAA | 0 | | 0.0% | | 0.0% | | 0.0% | | NJCAA | | | | | | | |
| | Total | 0 | 0 | 0.0% | 0 | 0.0% | 0 | 0.0% | | Total | 0 | 0 | 0 | 0 | 0 | | |
| Current Athletes | Grad Yr | Total | Active | Active % | Average | Avg % | Inactive | Inactive % | History Swimmers | Grad Yr | 12/31/11 | 11/30/11 | 10/31/11 | 6/30/11 | 12/31/10 | YTD Growth | 12 mo Growth |
| | 2012 Reg | 0 | | 0.0% | | 0.0% | | 0.0% | | 2012 Reg | | | | | | | |
| | 2012 Elite | 0 | | 0.0% | | 0.0% | | 0.0% | | 2012 Elite | | | | | | | |
| | 2013 Reg | 0 | | 0.0% | | 0.0% | | 0.0% | | 2013 Reg | | | | | | | |
| | 2013 Elite | 0 | | 0.0% | | 0.0% | | 0.0% | | 2013 Elite | | | | | | | |
| | 2014 Reg | 0 | | 0.0% | | 0.0% | | 0.0% | | 2014 Reg | | | | | | | |
| | 2014 Elite | 0 | | 0.0% | | 0.0% | | 0.0% | | 2014 Elite | | | | | | | |
| | 2015 Reg | 0 | | 0.0% | | 0.0% | | 0.0% | | 2015 Reg | | | | | | | |
| | 2015 Elite | 0 | | 0.0% | | 0.0% | | 0.0% | | 2015 Elite | | | | | | | |
| | Other Reg | 0 | | 0.0% | | 0.0% | | 0.0% | | Other Reg | | | | | | | |
| | Other Elite | 0 | | 0.0% | | 0.0% | | 0.0% | | Other Elite | | | | | | | |
| | Total Reg | 0 | 0 | 0.0% | 0 | 0.0% | 0 | 0.0% | | Total Reg | 0 | 0 | 0 | 0 | 0 | | |
| | Total Elite | 0 | 0 | 0.0% | 0 | 0.0% | 0 | 0.0% | | Total Elite | 0 | 0 | 0 | 0 | 0 | | |
| Current HS/Club | Type | Total | Active | Active % | Average | Avg % | Inactive | Inactive % | History HS/Club | Type | 12/31/11 | 11/30/11 | 10/31/11 | 6/30/11 | 12/31/10 | YTD Growth | 12 mo Growth |
| | HS | 0 | | 0.0% | | 0.0% | | 0.0% | | HS | | | | | | | |
| | Club | 0 | | 0.0% | | 0.0% | | 0.0% | | Club | | | | | | | |
| | Other | 0 | | 0.0% | | 0.0% | | 0.0% | | Other | | | | | | | |
| | Total | 0 | 0 | 0.0% | 0 | 0.0% | 0 | 0.0% | | Total | 0 | 0 | 0 | 0 | 0 | | |

Geography (see Admin MetaData Geography - also show breakdown by state)

| | | Total | Active | Active % | Average | Avg % | Inactive | Inactive % | | | 12/31/11 | 11/30/11 | 10/31/11 | 6/30/11 | 12/31/10 | YTD Growth | 12 mo Growth |
|---|---|---|---|---|---|---|---|---|---|---|---|---|---|---|---|---|---|
| Current Coaches | Location | | | | | | | | History Coaches | Location | | | | | | | |
| | Northeast | 0 | | 0.0% | | 0.0% | | 0.0% | | Northeast | | | | | | | |
| | Southeast | 0 | | 0.0% | | 0.0% | | 0.0% | | Southeast | | | | | | | |
| | Midwest | 0 | | 0.0% | | 0.0% | | 0.0% | | Midwest | | | | | | | |
| | Southwest | 0 | | 0.0% | | 0.0% | | 0.0% | | Southwest | | | | | | | |
| | West | 0 | | 0.0% | | 0.0% | | 0.0% | | West | | | | | | | |
| | Total | 0 | 0 | 0.0% | 0 | 0.0% | 0 | 0.0% | | Total | 0 | 0 | 0 | 0 | 0 | | |
| Current Swimmers | Location | Total | Active | Active % | Average | Avg % | Inactive | Inactive % | History Swimmers | Location | 12/31/11 | 11/30/11 | 10/31/11 | 6/30/11 | 12/31/10 | YTD Growth | 12 mo Growth |
| | Northeast | 0 | | 0.0% | | 0.0% | | 0.0% | | Northeast | | | | | | | |
| | Southeast | 0 | | 0.0% | | 0.0% | | 0.0% | | Southeast | | | | | | | |
| | Midwest | 0 | | 0.0% | | 0.0% | | 0.0% | | Midwest | | | | | | | |
| | Southwest | 0 | | 0.0% | | 0.0% | | 0.0% | | Southwest | | | | | | | |
| | West | 0 | | 0.0% | | 0.0% | | 0.0% | | West | | | | | | | |
| | Non-US | 0 | | 0.0% | | 0.0% | | 0.0% | | Non-US | | | | | | | |
| | Total | 0 | 0 | 0.0% | 0 | 0.0% | 0 | 0.0% | | Total | 0 | 0 | 0 | 0 | 0 | | |
| Current HS/Club | Location | Total | Active | Active % | Average | Avg % | Inactive | Inactive % | History HS/Club | Location | 12/31/11 | 11/30/11 | 10/31/11 | 6/30/11 | 12/31/10 | YTD Growth | 12 mo Growth |
| | Northeast | 0 | | 0.0% | | 0.0% | | 0.0% | | Northeast | | | | | | | |
| | Southeast | 0 | | 0.0% | | 0.0% | | 0.0% | | Southeast | | | | | | | |
| | Midwest | 0 | | 0.0% | | 0.0% | | 0.0% | | Midwest | | | | | | | |
| | Southwest | 0 | | 0.0% | | 0.0% | | 0.0% | | Southwest | | | | | | | |
| | West | 0 | | 0.0% | | 0.0% | | 0.0% | | West | | | | | | | |
| | Non-US | 0 | | 0.0% | | 0.0% | | 0.0% | | Non-US | | | | | | | |
| | Total | 0 | 0 | 0.0% | 0 | 0.0% | 0 | 0.0% | | Total | 0 | 0 | 0 | 0 | 0 | | |

Conference Coverage

| | Conf | Total | Have | % | To Get | % | | Conf | 12/31/11 | 11/30/11 | 10/31/11 | 6/30/11 | 12/31/10 | YTD Growth | 12 mo Growth |
|---|---|---|---|---|---|---|---|---|---|---|---|---|---|---|---|
| Current Coaches | Big 10 | 0 | | 0.0% | | 0.0% | History Coaches | Big 10 | | | | | | | |
| | Big East | 0 | | 0.0% | | 0.0% | | Big East | | | | | | | |
| | etc | 0 | | 0.0% | | 0.0% | | etc | | | | | | | |
| | etc | 0 | | 0.0% | | 0.0% | | etc | | | | | | | |
| | etc | 0 | | 0.0% | | 0.0% | | etc | | | | | | | |
| | Total | 0 | 0 | 0.0% | 0 | 0.0% | | Total | 0 | 0 | 0 | 0 | 0 | | |

Swimmer Quality (see Admin MetaData SCY Swimmer Quality)

| | Level | Total | Active | Active % | Average | Avg % | Inactive | Inactive % | | Level | 12/31/11 | 11/30/11 | 10/31/11 | 6/30/11 | 12/31/10 | YTD Growth | 12 mo Growth |
|---|---|---|---|---|---|---|---|---|---|---|---|---|---|---|---|---|---|
| Current Swimmers [grad year] | Above | 0 | | 0.0% | | 0.0% | | 0.0% | History Swimmers [grad year] | Above | | | | | | | |
| | AAAA | 0 | | 0.0% | | 0.0% | | 0.0% | | AAAA | | | | | | | |
| | AAA | 0 | | 0.0% | | 0.0% | | 0.0% | | AAA | | | | | | | |
| | AA | 0 | | 0.0% | | 0.0% | | 0.0% | | AA | | | | | | | |
| | A | 0 | | 0.0% | | 0.0% | | 0.0% | | A | | | | | | | |
| | Below | 0 | | 0.0% | | 0.0% | | 0.0% | | Below | | | | | | | |
| | Total | 0 | 0 | 0.0% | 0 | 0.0% | 0 | 0.0% | | Total | 0 | 0 | 0 | 0 | 0 | | |

New Users By Source

| | Source | Total | Athlete | Elite Ath | College | HS | Club |
|---|---|---|---|---|---|---|---|
| New Users Between [date 1] and [date 2] | HS Coach | 0 | | | | | |
| | HS Counsel | 0 | | | | | |
| | Club Coach | 0 | | | | | |
| | Athlete | 0 | | | | | |
| | Col Coach | 0 | | | | | |
| | Web Search | 0 | | | | | |
| | LFI email | 0 | | | | | |
| | LFI ad | 0 | | | | | |
| | Event | 0 | | | | | |
| | Other | 0 | | | | | |
| | Total | 0 | 0 | 0 | 0 | 0 | 0 |

Pricing Table (per sport)

| Member Type | Membership Fee | Users over One Fee | Term (Months) | Fee Effective Start | Fee Effective Stop | Proration Supplement |
|---|---|---|---|---|---|---|
| Athlete | $0.00 | NA | NA | 2/1/2012 | | NA |
| Elite Athl | $25.00 | NA | 6 | 2/1/2012 | | NA |
| HS-1 gend | $100.00 | $10.00 | 12 | 2/1/2012 | | NA |
| HS-2 gend | $150.00 | $10.00 | 12 | 2/1/2012 | | NA |
| CL-1 gend | $100.00 | $10.00 | 12 | 2/1/2012 | | NA |
| CL-2 gend | $150.00 | $10.00 | 12 | 2/1/2012 | | NA |
| College-1 | $200.00 | $20.00 | 12 | 2/1/2012 | | $100.00 |
| College-2 | $300.00 | $20.00 | 12 | 2/1/2012 | | $150.00 |

Total Searches, Most searched athlete, college, etc

Audit Trail of Adds, Changes, Deletes

REVENUE SUMMARY - Figure 19

By Type

| | | Jan | Feb | Mar | Apr | May | Jun | Jul | Aug | Sep | Oct | Nov | Dec | Total | |
|---|---|---|---|---|---|---|---|---|---|---|---|---|---|---|---|
| | 1901 → | | | | | | | | | | | | | | ← 1902 |
| Revenue | | | | | | | | | | | | | | | |
| College Coaches ← 1903 | | | | | | | | | | | | | | | |
| Subscriptions | | | | | | | | | | | | | | $0.00 | |
| Users | | | | | | | | | | | | | | $0.00 | |
| Total Coaches | | $0.00 | | | | | | | | | | | | $0.00 | |
| High Schools ← 1903 | | | | | | | | | | | | | | | |
| Subscriptions | | | | | | | | | | | | | | $0.00 | |
| Users | | | | | | | | | | | | | | $0.00 | |
| Total High Schools | | $0.00 | | | | | | | | | | | | $0.00 | |
| Clubs ← 1903 | | | | | | | | | | | | | | | |
| Subscriptions | | | | | | | | | | | | | | $0.00 | |
| Users | | | | | | | | | | | | | | $0.00 | |
| Total Coaches | | $0.00 | | | | | | | | | | | | $0.00 | |
| Athletes (Elite Subscriptions) ← 1903 | | $0.00 | | | | | | | | | | | | $0.00 | |
| Advertising ← 1903 | | $0.00 | | | | | | | | | | | | $0.00 | |
| Total Revenue 1902 | | $0.00 | $0.00 | $0.00 | $0.00 | $0.00 | $0.00 | $0.00 | $0.00 | $0.00 | $0.00 | $0.00 | $0.00 | $0.00 | |
| Subscriptions | | $0.00 | $0.00 | $0.00 | $0.00 | $0.00 | $0.00 | $0.00 | $0.00 | $0.00 | $0.00 | $0.00 | $0.00 | $0.00 | |
| Users | | $0.00 | $0.00 | $0.00 | $0.00 | $0.00 | $0.00 | $0.00 | $0.00 | $0.00 | $0.00 | $0.00 | $0.00 | $0.00 | |
| Advertising | | $0.00 | $0.00 | $0.00 | $0.00 | $0.00 | $0.00 | $0.00 | $0.00 | $0.00 | $0.00 | $0.00 | $0.00 | $0.00 | |

By Product

| | Jan | Feb | Mar | Apr | May | Jun | Jul | Aug | Sep | Oct | Nov | Dec | Total | |
|---|---|---|---|---|---|---|---|---|---|---|---|---|---|---|
| Revenue | | | | | | | | | | | | | | |
| Swimming ← 1903 | | | | | | | | | | | | | | |
| Men's | | | | | | | | | | | | | $0.00 | |
| Women's | | | | | | | | | | | | | $0.00 | |
| Total Swimming | $0.00 | | | | | | | | | | | | $0.00 | |
| Track ← 1903 | | | | | | | | | | | | | | |
| Men's | | | | | | | | | | | | | $0.00 | |
| Women's | | | | | | | | | | | | | $0.00 | |
| Total Track | $0.00 | | | | | | | | | | | | $0.00 | |
| Sport 3 ← 1903 | | | | | | | | | | | | | | |
| Men's | | | | | | | | | | | | | $0.00 | |
| Women's | | | | | | | | | | | | | $0.00 | |
| Total Sport 3 | $0.00 | | | | | | | | | | | | $0.00 | |
| Total Revenue | $0.00 | $0.00 | $0.00 | $0.00 | $0.00 | $0.00 | $0.00 | $0.00 | $0.00 | $0.00 | $0.00 | $0.00 | $0.00 | ← 1902 |

By Geography

| | Jan | Feb | Mar | Apr | May | Jun | Jul | Aug | Sep | Oct | Nov | Dec | Total | |
|---|---|---|---|---|---|---|---|---|---|---|---|---|---|---|
| Revenue | | | | | | | | | | | | | | |
| Midwest ← 1903 | | | | | | | | | | | | | | |
| Illinois | | | | | | | | | | | | | $0.00 | |
| Wisconsin | | | | | | | | | | | | | $0.00 | |
| Total Midwest | $0.00 | | | | | | | | | | | | $0.00 | |
| Southeast ← 1903 | | | | | | | | | | | | | | |
| Georgia | | | | | | | | | | | | | $0.00 | |
| Florida | | | | | | | | | | | | | $0.00 | |
| Total Southeast | $0.00 | | | | | | | | | | | | $0.00 | |
| West ← 1903 | | | | | | | | | | | | | | |
| California | | | | | | | | | | | | | $0.00 | |
| Oregon | | | | | | | | | | | | | $0.00 | |
| Total West | $0.00 | | | | | | | | | | | | $0.00 | |
| Total Revenue | $0.00 | $0.00 | $0.00 | $0.00 | $0.00 | $0.00 | $0.00 | $0.00 | $0.00 | $0.00 | $0.00 | $0.00 | $0.00 | ← 1902 |

2/21/2013

Girls Swimming
Strength Rankings - Figure 20

Region: [US, Region, or State]  Event: [optional]
Graduation Class: [optional]

| Rank | Strength [2012] [IL] Swimmers | Rank | Strength [IL] High Schools | Rank | Strength [IL] Clubs |
|---|---|---|---|---|---|
| 1 | 240 Hsu, Connie (IL) | 1 | 1,657 New Trier | 1 | 1,233 New Trier Swim Club (IL) |
| 2 | 226 James, Samantha (IL) | 2 | 1,530 Fenwick | 2 | 1,132 Lake Forest Swim Club (IL) |
| 3 | 212 Stoehr, Rachel (IL) | 3 | 1,422 Rosary | 3 | 1,087 Barrington Swim Club (IL) |
| 4 | 202 Smith, Emma (IL) | 4 | 1,377 Loyola | 4 | 1,044 Westmont Swim Club (IL) |
| 5 | 196 Remick, Mallory (IL) | 5 | 1,250 Glenbrook South | 5 | 987 Patriot Aquatics (IL) |
| 6 | 180 Launer, Emily (IL) | 6 | 1,211 Neuqua Valley | 6 | 965 Glenbrook Aquatics (IL) |
| 7 | 168 Coonce, Molly (IL) | 7 | 1,133 Downers Grove North | 7 | 943 St Charles Swim Team (IL) |
| 8 | 166 Lynn, Lori (IL) | 8 | 1,111 Lyons | 8 | 854 Acadamy Bullits Swim Club (IL) |
| 9 | 157 Elliot, Erika (IL) | 9 | 1,075 Hinsdale Central | 9 | 798 Scout Aquatics (IL) |
| 10 | 154 Scott, Morgan (IL) | 10 | 1,003 Lake Forest | 10 | 766 Cats Aquatics (IL) |

| Rank | Time [2012] [IL] 100 Breast | Rank | Strength [IL] High Schools - 100 Breast | Rank | Strength [IL] Clubs - 100 Breast |
|---|---|---|---|---|---|
| 1 | 1:03.96 Kaminski, Paulina (IL) | 1 | 221 New Trier | 1 | 212 New Trier Swim Club (IL) |
| 2 | 1:04.47 Sellers, Megan (IL) | 2 | 200 Fenwick | 2 | 164 Lake Forest Swim Club (IL) |
| 3 | 1:04.51 Garland, Michelle (IL) | 3 | 186 Rosary | 3 | 143 Barrington Swim Club (IL) |
| 4 | 1:04.78 Lucenti, Kara (IL) | 4 | 185 Loyola | 4 | 122 Westmont Swim Club (IL) |
| 5 | 1:04.81 Wickham, Haley (IL) | 5 | 176 Glenbrook South | 5 | 100 Patriot Aquatics (IL) |
| 6 | 1:04.86 Coonce, Molly (IL) | 6 | 164 Neuqua Valley | 6 | 98 Glenbrook Aquatics (IL) |
| 7 | 1:04.95 Hayward, Riley (IL) | 7 | 140 Downers Grove North | 7 | 96 St Charles Swim Team (IL) |
| 8 | 1:05.54 Hengels, Hallie (IL) | 8 | 120 Lyons | 8 | 84 Acadamy Bullits Swim Club (IL) |
| 9 | 1:05.62 Prorok, Rachel (IL) | 9 | 111 Hinsdale Central | 9 | 64 Scout Aquatics (IL) |
| 10 | 1:05.73 Taylor, Courtney (IL) | 10 | 106 Lake Forest | 10 | 60 Cats Aquatics (IL) |

Selection by State, Region, or US
Also can select strength rankings for specific event or combination of events

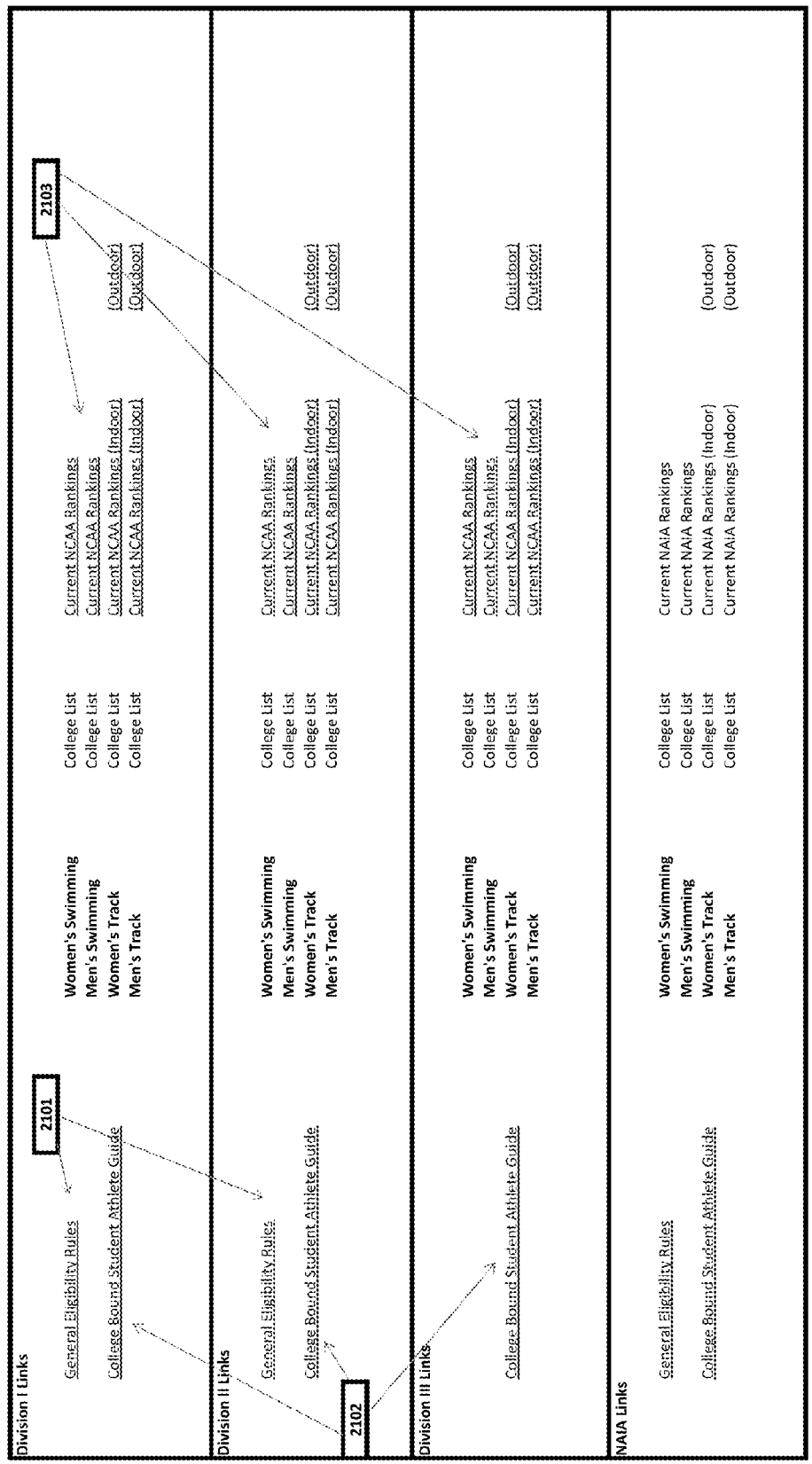

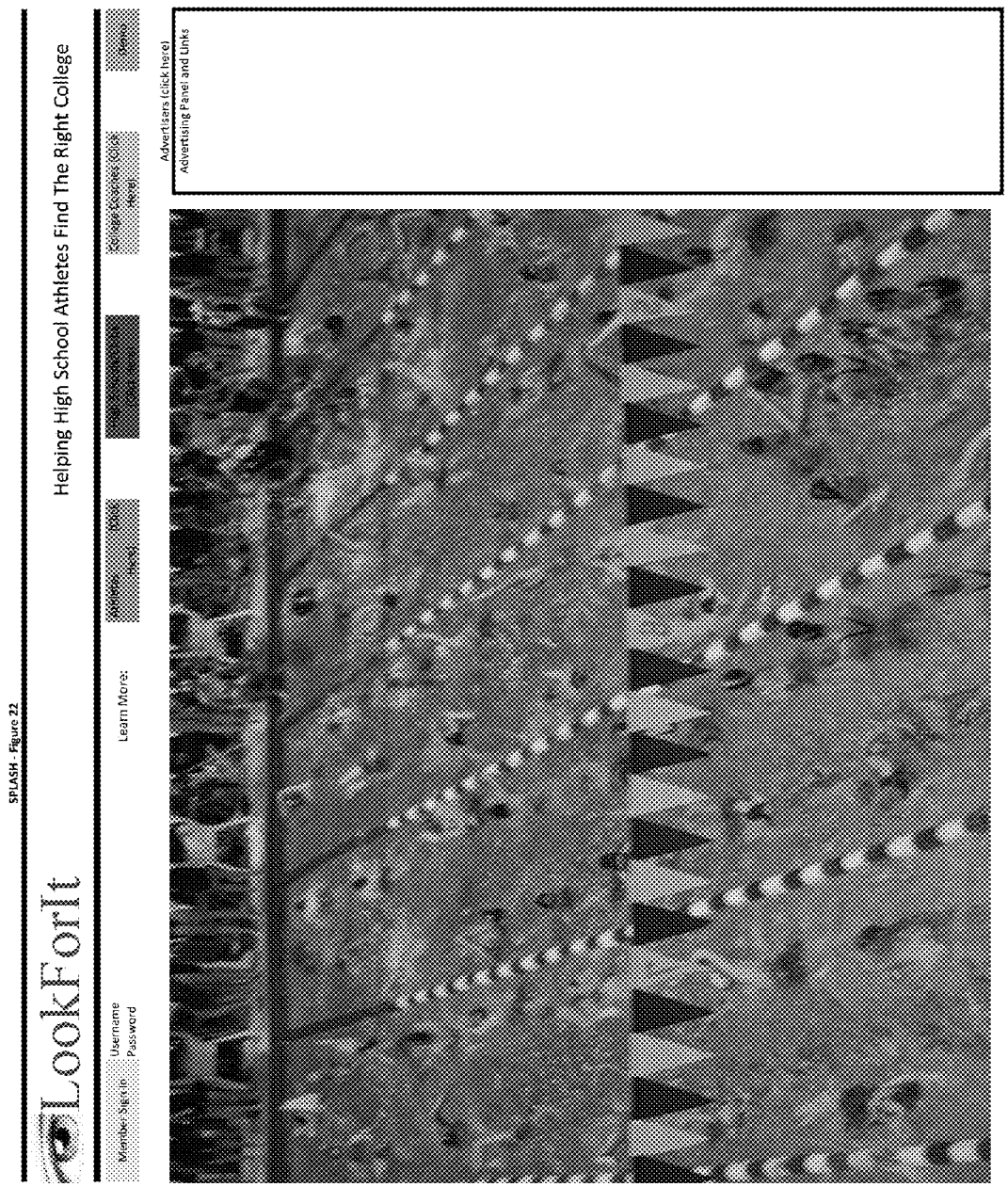

ELECTRONIC DATABASE FOR ATHLETES AND COACHES FOR RECRUITING PURPOSES

CROSS-REFERENCE TO RELATED APPLICATIONS

This application claims the benefit of U.S. Provisional Application Ser. No. 61/601,810, filed Feb. 22, 2012, which is hereby incorporated by reference in its entirety.

BACKGROUND OF THE INVENTION

The attraction of the site is that athletes can see a dynamic list of colleges where the athlete's specific sports times (i.e. swimming or track) would qualify them to compete. As the athlete's times improve over the course of their high school career, the list of colleges changes as more and more colleges become candidates for the athlete. The athletes can easily communicate their times to the college coaches, and monitor the status of schools of interest (a very cumbersome process outside of LookForIt.com). Likewise, high schools and clubs can also assist students in the college search process given access to the same data as the athletes. College coaches can also have access to the athlete times and other recruiting information, and can customize their search so that athletes meeting the college recruiting guidelines (i.e. minimum times in specific events, grade point average of athlete, etc) are highlighted across the sea of recruits, while those not meeting the recruiting guidelines can be ignored.

BRIEF DESCRIPTION OF THE DRAWINGS

FIG. 1 is a representative screen shot illustrating one Athlete Input screen displayed by the web-based application according to one embodiment.

FIG. 2 is a representative screen shot illustrating one Athlete Parameters Input screen displayed by the web-based application according to one embodiment.

FIG. 3 is a representative screen shot illustrating one Quick Search screen displayed by the web-based application according to one embodiment.

FIG. 4 is a representative screen shot illustrating one Athlete Search screen displayed by the web-based application according to one embodiment.

FIG. 5 is a representative screen shot illustrating one Athlete Dashboard screen displayed by the web-based application according to one embodiment.

FIG. 6 is a representative screen shot illustrating one Elite Athlete Dashboard screen displayed by the web-based application according to one embodiment.

FIG. 7 is a representative screen shot illustrating one Elite Conference View screen displayed by the web-based application according to one embodiment.

FIG. 8 is a representative screen shot illustrating one Elite Rankings screen displayed by the web-based application according to one embodiment.

FIG. 9 is a representative screen shot illustrating one Elite Summary screen displayed by the web-based application according to one embodiment.

FIG. 10 is a representative screen shot illustrating one Athlete Progress screen displayed by the web-based application according to one embodiment.

FIG. 11 is a representative screen shot illustrating one Athlete Summary screen displayed by the web-based application according to one embodiment.

FIG. 12 is a representative screen shot illustrating one High School—Club Input screen displayed by the web-based application according to one embodiment.

FIG. 13 is a representative screen shot illustrating one High School—Club Dashboard displayed by the web-based application according to one embodiment.

FIG. 14 is a representative screen shot illustrating one Coach Input screen displayed by the web-based application according to one embodiment.

FIG. 15 is a representative screen shot illustrating one Coach Search screen displayed by the web-based application according to one embodiment.

FIG. 16 is a representative screen shot illustrating one Coach Dashboard screen displayed by the web-based application according to one embodiment.

FIG. 17 is a representative screen shot illustrating one Administrative Input screen displayed by the web-based application according to one embodiment.

FIG. 18 is a representative screen shot illustrating one Administrative Dashboard screen displayed by the web-based application according to one embodiment.

FIG. 19 is a representative screen shot illustrating one Administrative Revenue screen displayed by the web-based application according to one embodiment.

FIG. 20 is a representative screen shot illustrating one Strength Rankings screen displayed by the web-based application according to one embodiment.

FIG. 21 is a representative screen shot illustrating one Research Center screen displayed by the web-based application according to one embodiment.

FIG. 22 is a representative screen shot illustrating one splash screen displayed by the web-based application according to one embodiment.

DESCRIPTION OF THE SPECIFIC EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

I. Summary

This document summarizes the technical approach that will be taken to develop and operate LookForIt.com. Although this document provides a comprehensive explanation of functions contained within the application, a more complete understanding of the process flows, data elements and user experience can be found by executing the design prototype created for LookForIt.com. Screen prints from this prototype are included in this document, but the developer should also rely on executing the actual prototype to fully understand how this application is intended to operate. Examples given throughout this document often relate to women's swimming. The developer should keep in mind that the site will support multiple sports for both men and women.

A. General Design Concepts

The LookForIt.com web site (www.lookforit.com) will be designed to make it easier for high school athletes to find and communicate with college coaches that might be interested in the athlete competing for their college. The application also makes it easier for college coaches to find athletes that might fit into the college athletic program. Beyond athletes and colleges, the site will also be of interest to high school coaches, high school college resource centers, as well as club coaches that are interested in helping high school athletes with their college selection.

The attraction of the site is that athletes can see a dynamic list of colleges where the athlete's specific sports times (i.e. swimming or track) would qualify them to compete. As the athlete's times improve over the course of their high school career, the list of colleges changes as more and more colleges become candidates for the athlete. The athletes can easily communicate their times to the college coaches, and monitor the status of schools of interest (a very cumbersome process outside of LookForIt.com). Likewise, high schools and clubs can also assist students in the college search process given access to the same data as the athletes. College coaches can also have access to the athlete times and other recruiting information, and can customize their search so that athletes meeting the college recruiting guidelines (i.e. minimum times in specific events, grade point average of athlete, etc) are highlighted across the sea of recruits, while those not meeting the recruiting guidelines can be ignored.

The site provides access to two primary data stores. One is a database of athlete times in events of a given sport. The other is a database of college times in events of a given sport. The top three college times in each event are maintained for each Division I, II, III, NAIA and NJCAA college in the US (eg. The top three swimmer 100 breaststroke times for Duke University in the 2011/2012 swim season are maintained). Using these two databases (and some other parameters), data is sliced and diced for display customized to the user (athlete, coach, high school or club).

In general, athletes can access the site for free, while coach, high school and club users will be charged a periodic fee to access the site. Athletes who elect an elite membership will also be charged a periodic fee to access the site.

The site will be accessible to internet users on a 24×7 basis. Failover techniques including replication should be used to insure that there is virtually no downtime with the application. Response times for virtually all activities will be sub second. Physical storage of the data will be in the United States. Any technology used in the development of the application will be considered industry standard, widely used, and have a broad based of personnel that would be qualified to maintain the application.

All web pages within the application will conform to a common template format. In the top left of each screen, the application icon ("the eye") as well as the company name (LookForIt.com) will be displayed. Access will be provided to users with personal computers, iPads or smart phones. Support for advertising panels on all web pages will also be provided.

B. Development Priorities

Although the total scope of this project is not large, it is important to develop the features in such a way as to be able to add certain users before others. The general development strategy will be to first open the site to high school girl's swimmers. Next, the site will be opened to high schools/clubs with female swimmers. Once a critical mass of athlete records are maintained on the system, the site will be opened to college coaches with a women's swim team. Once this has been successful, the site will be opened to male swimmers and associated high schools/clubs/colleges, then male and female track and field athletes and associated high schools/clubs/colleges.

C. Metadata

Metadata is an important concept within the design of LookForIt.com. The general design concept is to allow a non-programmer to be able to add new sports and events through tables established with the initial design of LookForIt.com. For example, each sport (ie Swimming) is comprised of several events (ie 100 breaststroke, 400 Individual Medley). Each sport may also have a separate team for males and a separate team for females. In addition, each event may track their results in a different way (eg, swimming events are in minutes, seconds, and tenths of seconds, while field events like the Javelin might track results in feet and inches). These characteristics are transformed by metadata tables into terminology and data edits that makes sense for specific sports. This terminology is referenced by appropriate LookForIt.com screens when displaying a field. See section II.D.i (Administrative Input) for more details.

Beyond metadata, the application depends on data in a variety of tables (see section IV.B. Reference Databases). These tables are to be maintainable by a non-programmer administrative user of LookForIt.com. The general idea is that the design of this application should support the addition of new information (eg. new table entries, advertising, links) and new sports (new metadata) without the need for additional application or web development.

II. Functions a. Athlete i. Establish Account

Description: The initial splash page will direct the user to the correct account set up. If the user is an athlete, this is the page that will establish the account (note: if a high school or club has already entered the athlete, those fields enterable by the high school/club will already exist. In this event, the user will be asked to confirm that they are the same person). The user will be asked to establish a sign-on and email. In addition, the user will identify the sport and the athlete's gender. There will also be a legal disclaimer which the athlete must agree to, and a clause that says that LookForIt.com has the right to delete their membership if there has been no access by the athlete for a year.

Prototype Cross Reference: Splash—FIG. 22

Key Characteristics: Sign-on must be unique and meet standard length/strength guidelines. Athletes can't use a sign-on that is a part of a college name, or that is offensive (per list). The email address will be used to send a temporary password back to the athlete. This is to insure that email addresses are accurate. Once the athlete signs back on with the Sign-on and temporary password, the athlete will be asked to change the password. The athlete will also indicate where they heard of LookForIt.com. Choices are:

From a high school coach
From a high school college counseling department
From a club coach
From another athlete
From a college coach
From a web search
From a LookForIt email
From an advertisement [specify]
From an athletic event [specify]
Other [specify]

Other Considerations: The athlete will also have an option to establish an elite account. The page will display advantages of an elite membership. If elected, credit card information is processed and stored for renewal use. Cost and term for elite membership can be found in the Pricing Table. The cost charged to the credit card is spread evenly over the term and entered over the appropriate months on the Admin Revenue (summary and detail) pages.

Standard membership provides access to the following pages:
- Athlete Input—FIG. 1 (including Athlete Parameters—FIG. 2)
- Quick Search—FIG. 3
- Athlete Search—FIG. 4
- Athlete Dashboard—FIG. 5
- Athlete Summary—FIG. 11
- Strength Rankings—FIG. 20

Elite membership provides access to all standard membership pages plus the following:
- Athlete Progress—FIG. 10
- Elite Athlete Dash—FIG. 6
- Elite Conf View—FIG. 7
- Elite Rankings—FIG. 8
- Elite Summary—FIG. 9

Upon completing this page, an athlete member record is created along with the date that standard membership was established. If elite membership is elected, the date elite membership was established is also recorded along with the date that the term of membership is due for renewal. If elite membership is cancelled, an option to continue standard membership will be offered. For a standard membership, if there have been no logon attempts for a user ID for a period of one year, the standard membership will be cancelled (the ability for LFI to cancel the membership will be stated in the initial membership legal boilerplate info).

ii. Input

Description: Provides the facility for the athlete to input sport best times as well as information to be communicated to college coaches. Format and edits of the Best Times section is variable by sport and based on the Event Rules Table (see Admin-Metadata).

Prototype Cross Reference: Athlete Input (FIG. 1), Athlete Parameters (FIG. 2)

Key Characteristics: Best times 101 and dates 102 are entered by the athlete. Times for any event can be left blank 103. If a time is entered in any event, a corresponding date must be present. An edit will be performed on the time to insure reasonableness. If the time is faster than a NCAA "B" Cut time, a message will be displayed to ask the athlete if they are sure. If confirmed, the time will be accepted. If the time is faster than an Olympic trial time, the update will be rejected with a message that says to email LookForIt.com with proof of the time (specific meet name and date). Times are stored historically with their associated dates to enable Athlete Progress Reporting (see section II.a.vi). An edit will also exist to restrict the number of updates that an athlete can perform in a 24 hour period (parameter controlled by LFI Admin). This is an attempt to avoid suspicious users from trying to derive information from the college times database by frequently changing event times. Likewise, there will be an edit to prevent changing the athlete's name once it has been established (allow for one change to allow for an initial typo). The athlete will have the ability to edit historical times/dates (to load historical information or to correct errors) and can delete any time. Any time entered with a more current date than the previously entered time must be equal to or faster than the previously entered time in a given event.

Beyond times, the athlete will input contact information 104 that will be accessible to subscribing college coaches. The only required information is birth date, address, and graduation year. In addition, the athlete will specify their preferred method of communication for certain alerts 105 (email, text or Facebook), as well as other display preferences such as which school Divisions to display/not display 106 and to limit displays to colleges within specified states or geographic regions 107.

Other Considerations: If the athlete has an elite membership, an additional set of data will be displayed for the athlete to select options including:
- Inclusion of one picture 108
- List of up to 10 college conferences to compare athlete times with 109
- Reporting exclusion criteria including ability to eliminate selected columns in athlete dashboard, eliminate colleges from display if they are too slow (ie if the athlete's times are "X" seconds faster than the #1, #2 or #3 time in a selected event at the school 110), if enrollment at the college is outside of a user specified range, if the college has an enhanced disability program, etc.

The Athlete Parameters page (FIG. 2) allows the athlete to customize the look and actions of certain views. The following characteristics are defined on this page:
- Colors that designate if the athlete might be the #1, #2, #3 or close athlete in an event at a college 201
- The time to consider an athlete time as "close" (ie if the athlete time is 2 seconds slower than the #3 athlete in an event, the athlete may want to designate that event as "close". Close times are defined by distance (ie the 200 yard breaststroke and the 200 yard backstroke will have a common "close" parameter for 200 yard events) 202.
- The events that are not to be displayed on pages (ie an Athlete may not compete in a given event and may want to always eliminate the display of that event) 203
- The divisions that are to be displayed (ie an Athlete may know that they only want to consider Division I schools, so don't display the other divisions) 204.

An edit will be performed on the "close" times section to insure the times are reasonably close. Close times will be rejected if they are more than four times greater than the default values defined in the Default Athlete Close column of the Event Rules Table.

iii. Quick Search

Description: Provides the facility for the athlete to input their gender, a single event best time and checklist of applicable college divisions. The application will return all the colleges within the selected divisions where the athlete would be the #1, #2 or #3 swimmer (or be close to the #3 swimmer) in that event. The purpose of this page is to display the power of the application to prospective users at sporting events in the hope that they will sign up for the application. Access to this screen by non-members can only be accomplished through a demonstration by a LookForIt administrative user. It can also be used by an existing athlete member to simplify the results that would otherwise display on the Athlete Summary page.

Prototype Cross Reference: Quick Search—FIG. 3

Key Characteristics: A single best time 301 in a single event 302 is entered by the athlete. An edit will be performed on the time to insure reasonableness. If the time is faster than a NCAA "B" Cut time, a message will be displayed to ask the athlete if they are sure. If confirmed, the time will be accepted.

Once accepted, the athlete time for the event will be compared against the College Times Database for the sport/gender/event match for selected divisions. Colleges where the athlete time is "close" (see other considerations) but not faster than the #3 time at the college are listed in the "Close at" section 303. Colleges where the athlete time is faster than the #3 time but not faster than the #2 time are listed in the #3 section 304. Colleges where the athlete time is faster than the #2 time but not faster than the #1 time are listed in the #2 section 305. Colleges where the athlete time is faster than the #1 time are listed in the #1 section 306. Colleges not meeting the above criteria are not listed.

Other Considerations: If the athlete has a membership, the definition of "close" is determined by the parameters entered by the athlete on the Athlete Parameters page 202. If the athlete does not have a membership, the definition of close is determined by comparing the #3 college time with athlete's time less the Default Close Athlete field in the Event Rules Table. The time in this table means that if the athlete's time improved by the time in the Default Close Athlete field, then the athlete would achieve at least the time of the #3 athlete at the college. For example, if the athlete's time in the 100 breaststroke is 1:05.50 and the time in the Default Close Athlete column of the Event Rules Table is 0:02.00, then the athlete would be reported as "close" at a college where the #3 time in the event was between 1:03.50 and 1:05.49. If there is not a college #3 time, there is no "close" calculation performed.

iv. Search

Description: Provides the ability for the athlete to search for colleges that meet the athlete's selection criteria.

Prototype Cross Reference: Athlete Search—FIG. 4

Key Characteristics: One or more of the following selection criteria can be used by the athlete to search for colleges:

Divisions: Select one or more division for the search. Note: if Division is the only selection criteria identified, then only Colleges within those divisions where the athlete is "close" or better in at least one event will be displayed.

Times: Select one or more events and the associated position that the athlete's time in that event must achieve. The athlete can also specify to exclude College's if the athlete's time is X number of seconds faster than the #1 time at the college in a specified event or events.

Location: Select only colleges in a state, a group of states, a region, or group of regions.

Enrollment: Select only colleges with an enrollment (from College Table) between the low and high specified.

Tuition: Select only colleges with a tuition (either in-state or out of state from the College Table depending on the match between the athlete state and the college state) between the low and high specified.

With Special Programs: Select only colleges with "special programs' (from the College Table). Initially the only special program is "enhanced disability services". Additional special programs will be added in the future.

Other Considerations: For any colleges that meet the selected criteria, the athlete also has the option of moving the college directly to the watch list on the Athlete Dashboard (regardless of whether or not the college shows up on the Might Swim At section of the Athlete Dashboard.

v. Dashboard

Description: Displays the results of comparing the athlete times from Athlete Input with the college times in the College Times Database. There are two main sections within the dashboard as follows:

1) Athlete Information—the header section 501 of the dashboard displays the most current times for each of the athlete's events. Clicking on an athlete time for an event 502 will activate a link to the Athlete Progress graph for that event (if history is available). Below each event is a strength index calculation 503 (see Strength Index Table). The strength index is totaled to the right of this header section 505, and a summary of the top two best strokes (based on the strength index) are displayed 506.

2) College Information—This section 507 displays any colleges where the athlete's times in at least one event would qualify them as 'close' to competing at that college or would qualify them to be the #1, #2, or #3 athlete in at least one event. The college name, icon and division are displayed on the left 508. Clicking on the college name activates a hyper link to the college athletic web site for the sport/gender combination. Right clicking on the college name activates a hyper link to the College Table to display City, State, Division, Enrollment, Tuition and other identifying information about the college (excluding Athletic Director email). Clicking on the college icon activates a hyper link to the college main academic web site.

Prototype Cross Reference: Athlete Dashboard—FIG. 5

Key Characteristics: Colleges that are not excluded based on the Athlete Parameters and that meet at least the 'close' requirement are placed in the Might Compete At section 509. Cells are highlighted with colors based on parameters set by the athlete on the Athlete Parameters page. Any event in which the athlete's times would be #1, #2, #3 or close at a college will have the parameter colored filled in for that event. The time displayed in each cell is the time necessary to achieve in order to move up one more spot on the college team 510 (ie. if the athlete had a time that qualified as the #3 swimmer at the college, and the #2 swimmer at that college had a time of 1:05.44, then the time of 1:05.44 would be placed in the cell along with a color that corresponded to the athletes parameter for the #3 position). In the event the athlete has the #1 time in an event, "#1" will be displayed instead of a time along with the color designated for the #1 position by the athlete. If no colors are selected on the Athlete Parameter page, the following default colors will be used:

1 is blue 511
2 is red 512
3 is silver 513

A college can only appear in one section at a time. The sections are 1) Might Compete At 509, 2) Watch List 514, 3) Contacted List 515, 4) Visited List 516, and 5) Committed To 517. The total count of colleges in each section are totaled in the section heading. Colleges can be moved by the athlete from the Might Compete At section to other sections at any time through the Action column 518 on the right side of this page, or by similar functions that appear on the Athlete Search and Athlete Summary pages. Even though an athlete might not even be 'close' in times, the athlete can still select a college for the Watch List or Contacted sections. Colleges can only be moved into the Contacted section if 1) it is after September 1 of the athletes Junior year in high school, and 2) they click Send Times 519 in the Action field and confirm it is desired to send times and contact information to the particular college. Once this occurs, the college is moved into the Contacted section along with a message that indicates the date the times were sent. Colleges may also be moved from the Watch List back to the Might Compete At list or deleted entirely (in the event the college wouldn't qualify for the Might Compete At list). The action section for each listed college may contain optional notes 520 that the athlete can maintain regarding their impression of the school. LookForIt.com automatically moves colleges into the Contacted List as soon as times are sent by the athlete through LookForIt.com to the college. Automated messages appear in the Action section that document when the times were sent and when an acknowledgment from the coach is returned.

Other Considerations: In the event that times are sent by the athlete to the college, but the college is not a member of LookForIt.com, 1) the times are still posted to the Coach dashboard as if the college were a member, 2) a message is posted to the athlete indicating that the college is not currently a member but will be contacted by LookForIt.com to let them know that an athlete has submitted times to them, and 3) an email will be sent to the college (use Sport Coach Assistant Coach Email in College Member Table if present, otherwise use Athletic Director Email in College Table) by LookForIt.com encouraging them to become a member since one or more athletes have submitted times to them through the application. No more than one email per month will be sent as a reminder to the College.

In the event that there are more entries on the dashboard than will fit on one screen, one or more of the sections will become scrollable so that each section of the dashboard is still viewable from one page. Clicking on the section heading (eg Might Compete At) would expand the section to display only that section on a full page.

vi. Elite Dashboard

Description: For those athletes that have elected the Elite Membership and the current date is before the Elite Membership End Date (see Athlete Input—Admin View), this page displays the results of comparing the athlete times from Athlete Input with general time standards, athlete selected conference results, and other analytical comparisons. There are four main sections within the elite dashboard (which might be four pages or one page with three options) as follows:

1) Elite Athlete Dash—Displays athlete times in comparison to athlete quality standards for each event (see Admin Metadata—Swimmer Quality)
2) Elite Conf View—Displays athlete times in comparison to up to 10 college conference year end championship meet results (see Admin Metadata—Conference Times). Conferences are selected by the athlete on the Athlete Input—Elite section page
3) Elite Rankings—Displays a matrix that indicates the rank of the athlete's time in an event if compared to the total of all college times for that event in the application database (counting each of the #1, #2 and #3 times). Also displays a color coding for each cell that indicates whether the athlete's time would fall into the top 10%, the next 40%, the next 40%, or the bottom 10% of the times for that division and event.
4) Elite Summary—Displays a matrix that summarizes how many colleges (by division) the athlete qualifies to compete (based on an athlete supplied parameter). Also displays a matrix that summarizes how many college coaches (by division) have either received the athlete's information, shown that athlete meets the college recruiting standards, and/or has placed the athlete on the coach's watch list. Note: all colleges will be potentially reported here regardless of parameters on the Athlete Parameters page.

Prototype Cross Reference: Elite Athlete Dash (FIG. 6), Elite Conf View (FIG. 7), Elite Rankings (FIG. 8), Elite Summary (FIG. 9)

Key Characteristics:

1) Elite Athlete Dash—The main heading characteristics 601 are the same as found in the Athlete Dashboard. Beyond that, this page displays when the athlete has accomplished a standardized time milestone. For example, when a swimmer achieves a "AA" standard time, the date that standard was achieved will be displayed in the cell and the cell color will turn blue 602. For each cell that is not blue, the incremental time reduction needed to achieve that milestone will be displayed 603. For example, if a swimmer had a time of 1:00.00 and had achieved a "A" time, but needs 0:00.48 to make a "AA" time, the "A" cell will be blue, while the "AA" cell will have 0:00.48 displayed. All time standards can be found in the Time Standards Table (see Admin-Metadata). Note that the Olympic time and comparisons are made with LCM times only. All other time comparisons are with SCY times.

2) Elite Conf View—The main heading characteristics 701 are the same as found in the Athlete Dashboard. Beyond that, this page displays when the athlete has achieved a time that would have finished in a selected year end conference championship competition. If the athlete's time is found in the Conference Times Table (see Admin-Metadata) for any of up to 10 selected conferences (see Athlete Input—Elite 109), then the place that the athlete would have finished in the conference is displayed and the cell is turned blue 702. Clicking on a cell will display the total results from the specific conference as stored on the Conference Times Table. For each conference selected, a strength index for that conference is also calculated 703. The ten highest final Strength Index for each conference is based on the times in the Conference Times Table. No more than two times can be used in the preliminary calculation of the Strength Index, and no more than two events out of the five freestyle events can count in the final Strength Index (see section II.E.ii for details). Selected conferences are sorted so that the lowest Strength Index is listed at the top with the highest strength index at the bottom 704.

3) Elite Rankings—For each event and division (and for any events and divisions that have not been excluded on the Athlete Parameters page), the grid displays the absolute rank that the athlete's time would be compared to the total of all number 1, 2 and 3 swimmers with a time in that event within the application. If an athlete's time is equal to or faster than the slowest time of any of the number 1, 2, or 3 college times for that event, the cell will be color coded and the rank of the athlete will be displayed. The color of the cell depends on the percentile that the athlete's time is within all college times for that event. For example, if there were 100 times recorded within the number 1, 2 and 3 swimmers of the 100 breaststroke at division I colleges, and the athlete had the $60^{th}$ fastest time, then the athlete would have a percentile of 60%. The cell color is reported based on this percentile as follows:
   a. Top 10%—Blue
   b. Next 40%—Red
   c. Next 40%—Silver
   d. Next 10%—Yellow Within each cell with a color, the rank is also displayed, If the athlete had the $14^{th}$ fastest time (regardless of percentile), then "#14" would be displayed in the cell.

4) Elite Summary—This page displays information summarizing how strong the college athlete is. The athlete can input a parameter place (1, 2, or 3 with 3 as the default). The results portion of this section displays the number of colleges by division where the athlete would be at least that place on the team (ie at least $3^{rd}$ best in a given event). An event is any single event (ie 100 breaststroke). A stroke is a collection of related events (ie the 100 breaststroke "event" and the 200 breaststroke "event" comprise the breaststroke "stroke"). Clicking on any cell will display those colleges that make up the summary number (displayed in the same format at the Athlete Dashboard). The bottom portion of the page displays summary information regarding how many college coaches have received the athletes times, how many college's recruiting standards have been met by the athlete (see Coach Input), and how many colleges have the athlete on their watch list. Clicking on a cell in this section will not provide any more detail to maintain the privacy of coach information.

Other Considerations: The Elite Athlete Dash 604 and Elite Conf View 705 are intended to look like a swimming pool with lane line separating 10 swim lanes. As a swimmer accomplishes a goal, water fills up that part of the pool. For example, in the Elite Athlete Dash, accomplishing a goal is achieving a sport specific time cut in an event (eg Achieving an "A" time in a swimming event). As another example, in the Elite Conf View, accomplishing a goal is having a time that would finish in the selected college conference year end swim meet. In the event that the anticipated response time for any of these dashboards is greater than two seconds, it is acceptable for a nightly process to create the results of these dashboards to facilitate fast response times. If that is chosen, a message will be displayed that alerts the user to the fact that the information was current as of the previous night.

vii. Progress

Description: Provides a graphical representation of the improvement in athletic times for a given event over time 1001. The graph is only produced if there are two or more times recorded for an event. Accessed by clicking on the athlete time in a specific event.

Prototype Cross Reference: Athlete Progress—FIG. 10

Key Characteristics: The graph automatically scales to properly report the time improvement on the Y axis 1002, over the calendar time on the X axis 1003.

Other Considerations: If the progress page is accessed by a college coach, a high school coach or a club coach, the athlete's progress can be compared against one or more other athletes that appear on the coach's dashboard.

viii. Summary

Description: For each athlete stroke that is "close" or better to a college time (but only for Colleges and strokes that are not excluded based on the Athlete Parameters), displays the name of each Division I, II, III, NAIC, and/or NJCAA college that the athlete would qualify to compete (separately reported for having the #1, #2, #3, or close time).

Prototype Cross Reference: Athlete Summary—FIG. 11

Key Characteristics: If the athlete's time in an event minus the "close" parameter (see Athlete Parameters) for the appropriate distance is slower than the #3 time for the event at the college, then do not report the college. If the athlete's time in an event minus the "close" parameter for the appropriate distance is equal to or faster than the college #3 time, and not faster than the college #3 time, then report the college in the Close category for the event and division. If the athlete's time in an event is equal to or faster than the college #3 time, and not equal to or faster than the college #2 time, then report the college in the #3 category for the event and division. If the athlete's time in an event is equal to or faster than the college #2 time, and not equal to or faster than the college #1 time, then report the college in the #2 category for the event and division. If the athlete's time in an event is equal to or faster than the college #1 time, then report the college in the #1 category for the event and division.

Other Considerations: Only report the divisions and events that the athlete has defined on the Athlete Parameter page. If no "close" parameters have been established, assume the parameter is zero. Because the volume of this page could be large, separate tabs should be provide for each event unless the total requested results can fit on one viewable page (without scrolling). Clicking on a college name activates a hyper link to the college swim site (stored on College Times Database in prototype). Right clicking on the college name activates a hyper link to the College Table to display City, State, Division, Enrollment, Tuition and other identifying information about the college (excluding Athletic Director email). Clicking on the college icon activates a hyper link to the college main academic web site. Placing a "W" in the Action field moves the college into the athlete's Watch List. Placing a "C" in the Action field will generate a message that says "Please confirm that you want to send your best times and contact information to [name of college]". If confirmed and the current date is equal to or after September 1 of the athlete's Junior year of high school, then the times will be sent to the college dashboard. If confirmed and the current date is before September 1 of the athlete's Junior year of high school, then a message will be displayed that the athlete must wait until September 1 of Junior year to send, and the times will not be sent.

b. High School or Club i. Establish Account

Description: The initial splash page will direct the user to the correct account set up. If the user is a High School Coach, a High School Administrator or a Club Coach, this is the page that will establish the account. The user will be asked to establish a sign-on (but not a password).

Prototype Cross Reference: Splash—FIG. 22

Key Characteristics: Sign-on must be unique and meet standard length/strength guidelines.

To help insure that the user is really a valid high school or club, the user will be asked to provide an email address that can be traced to the high school or club. An email will be sent to that address with a temporary password. Once the user logs back in with the temporary password, they will be asked to change the password. The user will also indicate where they heard of LookForIt.com. Choices are:

From a high school coach
From a high school college counseling department
From a club coach
From an athlete
From a college coach
From a web search
From a LookForIt email
From an advertisement [specify]
From an athletic event [specify]
Other [specify]

Other Considerations: Credit card information is processed and stored for renewal use. Cost and term for high school/club membership can be found in the Pricing Table. The cost charged to the credit card is spread evenly over the term and entered over the appropriate months on the Admin Revenue (summary and detail) pages.

Membership provides access to the following pages:
High School—Club Input—FIG. 12
High School—Club Dashboard—FIG. 13
Athlete Input—Best Times section only—FIG. 1 (excluding Athlete Parameters)—See Note Below
Athlete Search—FIG. 4 (only for team members entered on HS-Club Input)
Athlete Summary—FIG. 11 (only for team members entered on HS-Club Input)
Strength Rankings—FIG. 20
Athlete Progress—FIG. 10 (only for team members entered on HS-Club Input)

Upon completing this page, a high school/club member record is created along with the date that membership was established and the date that the term of membership is due for renewal. Additional user records may also be created if more than one user is elected by the high school/club.

Note: High Schools and Clubs will establish the athlete record of times within the application, if the athlete does not already have a signon. If at a later time, the athlete sets up their own membership, the athlete and/or the high school/club can update times, but only the athlete can update information other than the fields designated in the next Input section.

ii. Input

Description: Provides the facility for the high school or club to input information on their high school/club, their team members (athletes), and team member sport best times as well as athlete information to be communicated to college coaches. Format and edits of the Best Times section is variable by sport and based on the Event Rules Table (Admin Metadata).

Prototype Cross Reference: HS-Club Input—FIG. 12, Athlete Input—FIG. 1 (Best Times section only)

Key Characteristics:

HS-Club Input Section—Coach and contact information for the high school/club are entered in this section 1201. The high school/club can also define various squads 1202 for their athletes. For example, a high school might define a Varsity squad and a Junior Varsity squad. A club might define different squads based on the age or skill of the athletes. Athletes are separated by squad on the HS-Club Dashboard page. In addition, any athletes that are to be tracked by the application are also entered here along with their gender, birth date, high school graduation year and squad 1203.

Athlete Input Section—If the athlete does not already have a membership record (ie. the Athlete name, birthdate, gender, graduation year matches a member), then best times and dates can be entered by the high school or club FIG. 1 (otherwise they can only be viewed by the high school/club). Times for any event can be left blank. If a time is entered in any event, a corresponding date must be present. An edit will be performed on the time to insure reasonableness. If the time is faster than a NCAA "B" Cut time, a message will be displayed to ask the athlete if they are sure. If confirmed, the time will be accepted. If the time is faster than an Olympic trial time, the update will be rejected with a message that says to email LookForIt.com with proof of the time (specific meet name and date). Times are stored historically with their associated dates to enable Athlete Progress Reporting (see section II.a.vi). An edit will also exist to restrict the number of updates that can be performed in a 24 hour period (parameter controlled by LFI Admin). This is an attempt to avoid suspicious users from trying to derive information from the college times database by frequently changing event times. The high school/club will have the ability to edit historical times/dates (to load historical information or to correct errors) and can delete any time. Any time entered with a more current date than the previously entered time must be equal to or faster than the previously entered time in a given event.

The high school/club will input the athlete's name, gender, birth date and high school graduation year which will populate the Information for Coaches section of the Athlete Input page FIG. 1. This information, the athlete times, and the high school/club information are the only athlete information that will be accessible to subscribing college coaches until the athlete sets up their own account. If the athlete has not set up their own account, college coaches will be directed to the high school/club to contact the athlete.

Other Considerations: High schools and clubs can manage times for athletes, but at some point the athlete may want to establish their own account on the application. High schools, clubs and athletes can update the times in an individual account as long as the following fields match: last name, first name, birthdate, graduation year, gender.

iii. Dashboard

Description: Displays the times of each high school or club athlete organized by squad 1301. There is an option to display gender 1302 and either SCY or LCM times 1303. Times are color coded 1304 to reflect the high school or club time standards 1305. The user can input their own standards for each event (eg, state meet time cuts) 1306 on the HS-Club Dashboard or can default to the swimmer quality categories in the Athlete Quality Table (Admin Metadata). If the user inputs their own time in the header (eg, state meet cut times), the Athlete Quality Table is ignored.

Prototype Cross Reference: HS-Club Dashboard—FIG. 13

Key Characteristics: Athletes and their times are separated by user defined squads 1307. The number of athletes in each section is summarized in the squad heading line 1308. Athletes are listed alphabetically by last name within squad 1309. Clicking on the athlete name 1310 activates a hyper link to the Athlete Input—Best Times page FIG. 1. Clicking on an individual time 1311 activates a hyper link to the Athlete Progress page (if more than one time is stored for the event) FIG. 10. Clicking on the College Options tag 1312 activates a hyper link to the Athlete Summary page FIG. 3 and FIG. 5.

If user supplied standard times are present in the heading section, times are highlighted in color if the athlete times are equal to or less than the entered standard for each event. If there are no standard times present, the athlete times are compared to the athlete quality categories in the Admin Metadata table. Cells are color coded based on the athlete quality cuts achieved.

Other Considerations: Squad headings can be color coded if the High School/Club has indicated a color when defining the squad on the HS-Club Input page FIG. 12.

c. College Coach i. Establish Account

Description: The initial splash page will direct the user to the correct account set up. If the user is a College Coach, this is the page that will establish the account. The user will be asked to establish a sign-on (but not a password).

Prototype Cross Reference: Splash—FIG. 22

Key Characteristics: Sign-on must be unique and meet standard length/strength guidelines.

To help insure that the user is really a valid college coach, the user will be asked to provide an email address that can be traced to the college and is asked if they are the head coach. If the user indicates they are the coach and the email address matches the coach email address in the College Members Table, an email will be sent to that address with a temporary password (otherwise a message will be displayed that says the email address does not match the college coach email address and the user will be asked to contact LookForIt.com for assistance). If user indicates they are not the coach and the email address suffix matches the valid email suffix stored in the College Table, an email will be sent to that address with a temporary password (otherwise a message will be displayed that says the email address does not match the college email address and the user will be asked to contact LookForIt.com for assistance). Once the user logs back in with the temporary password, they will be asked to change the password. The user will also indicate where they heard of LookForIt.com (Source in the College Member Table). Choices are:

From a high school coach
From a high school college counseling department
From a club coach
From an athlete
From a college coach
From a web search
From a LookForIt email From an advertisement [specify]

From an athletic event [specify]

Other [specify]

Other Considerations: Credit card information is processed and stored for renewal/cancellation use. Cost and term for a college coach membership can be found in the Pricing Table. The cost charged to the credit card is spread evenly over the term and entered over the appropriate months on the Admin Revenue (summary and detail) pages.

Membership provides access to the following pages:

Coach Input—FIG. 14

Coach Dashboard—FIG. 16

Athlete Input—FIG. 1 (but not Athlete Parameters)—Link from Coach Dashboard

Coach Search—FIG. 15

Strength Rankings—FIG. 20

Athlete Progress—FIG. 10—Link from Coach Dashboard

Athlete Elite View—Elite Dash (FIG. 6) and Conf View Only (FIG. 7)

Upon completing this page, a User and College Member record (if not already present) is created along with the date that membership was established and the date that the term of membership is due for renewal. Additional User records may also be created if more than one user is elected by the college. If the user is the head coach, the coach's sign on and password is written to the College Member Table in addition to the User Table.

ii. Input

Description: Provides the facility for the college coach to input contact information about the program 1401 and to input top three times per sport/gender event 1402 along with the college recruiting standards 1403, 1404, 1405, 1406. Format and edits of the Best Times section is variable by sport and based on the Event Rules Table (see Admin-Metadata).

Prototype Cross Reference: Coach Input—FIG. 14

Key Characteristics: Contact information and recruiting standards populate the College Member Table. Best times and dates are initially populated by the College Times Database. Coaches can elect whether they will update the times. If they do not, LookForIt will update the times at the end of each athletic season (once per year). Times for any event and place can be left blank. An edit will be performed on the time to insure reasonableness. If the time is faster than an Olympic trial time, a message will be displayed to ask the coach if they are sure. If confirmed, the time will be accepted. The #1 time must be equal to or faster than the #2 time, which must be equal to or faster than the #3 time. Times can be blank, but there can't be gaps in times (ie there can't be a missing #1 time, but have a #2 time). The "close" time 1404 has to be equal to or slower than the "interest" time. The "cutoff" times 1405 may be blank, but if present must be faster than the "interest" time. "Close" and "cutoff" times are rejected if there is no "interest" time. A warning message will display if the "interest" time is faster than the #1 time (but will be accepted).

Other Considerations: Only the head coach of a college can update top three times and recruiting standards. Assistant coaches and other personnel may be given user ids and have access to the full application, but only the head coach (as designated during the Establish Account Function and stored in the College Member Table) can update times.

iii. Search

Description: Provides the ability for the college coach to search for athletes that meet the coach's selection criteria.

Prototype Cross Reference: Coach Search—FIG. 15

Key Characteristics: One or more of the following selection criteria can be used by the coach to search for athletes:

Times: Select one or more events 1501 and the associated times 1502 that the athlete must have achieved in that event. In the case that more than one event is specified, the coach can also optionally specify the number of events that must be achieved in order for the athlete to be listed.

Location 1503: Select only athletes living in a state, a group of states, a region, or group of regions.

Graduation Date 1504: Select only athletes with a graduation date specified.

With Grades 1505: Select only athletes with a GPA and/or ACT and/or SAT within the criteria specified.

Power Index 1506: Select only athletes that have a Power Index between the specified values.

Other Considerations: For any athlete that meets the selected criteria, the coach also has the option of moving the athlete directly to the watch list on the Coach Dashboard (regardless of whether or not the athlete shows up on the Meets Recruiting Standards section of the Coach Dashboard.

iv. Dashboard

Description: Displays athletes that have submitted their times to the college through LookForIt.com 1601, and separately displays athletes that meet the college's recruiting standards 1602 or have been moved to a watch 1603, contacted 1604 or committed list 1605. Athlete name, graduation year, home state 1606 and strength index 1607 are displayed along with each of the best SCY times 1608.

Clicking on the athlete name 1609 activates a hyper link to the Athlete Input page of the web site FIG. 1 (Best Times and Information for Coaches). Clicking on a specific time in the dashboard 1610 activates a hyper link to the Athlete Progress page FIG. 10. Clicking on the Elite View activates a hyper link to the Elite Athlete Dash FIG. 6 and to the Elite Conf View FIG. 7 (but only for the conference that includes the college coach). Right clicking on an athlete name (after confirmation) reports the athlete as having all suspicious times. Right clicking on a specific event time within an athlete record (after confirmation) will report that specific athlete time as suspicious.

Prototype Cross Reference: Coach Dashboard—FIG. 16

Key Characteristics: Athletes that meet the following criteria are placed in the appropriate section of the Coach Dashboard:

Submitted Recruiting Profile 1601—Athletes that have submitted their times and contact information to the college through LookForIt.com are displayed in this section. Submissions could come from the Action on the Athlete Dashboard 519, or from the Action on the Athlete Summary pages.

Meets Recruiting Standards 1602—Athletes with at least one event in which the time is "close" but not faster than the "cutoff" (if present) as defined by the college recruiting standards, and meet any other recruiting standards defined by the college are displayed in this section. Athletes may be moved to any section except Submitted Recruiting Profile through the Action column.

Watch List 1603—Many athletes may be in the Submitted Recruiting Profile or Meets Recruiting Standards sections. Coaches can add or remove athletes of interest into this Watch List section through the Action field. Athletes can also be moved directly to the Watch List from the Coach Search page regardless of whether or not they show up on the Submitted Recruiting Profile page or the Meets Recruiting Standards page.

Contacted List 1604—Athletes that have been contacted by the college can be added or removed from this section through the Action field.

Committed List 1605—Athletes that have committed to attend the college can be added or removed from this section through the Action field.

Cells in each section are highlighted with colors based on parameters set by the coach on the Coach Input page. Any event in which the athlete's times would be #1, #2, #3 or close at a college will have the parameter color filled in for that event. The time displayed in each cell is the athlete's SCY best time in the event (from Athlete Input). If no colors are selected on the Athlete Parameter page, the following default colors will be used:

1 is blue 1611
2 is red 1612
3 is silver 1613

Other Considerations: An athlete can only appear in one section at a time. The total number of athletes in each section is reported in the section heading 1614. The action section for each listed athlete may contain optional notes that the coach can maintain regarding their impression of the athlete 1615.

d. Administrative i. Input

Description: Provides the facility for authorized administrative users to add, change or delete information in the application.

Prototype Cross Reference: Admin Input—FIG. 17

Key Characteristics: Administrative users will have signons and passwords that designate them as administrative users. Administrative users will have different levels of access granted as follows:

Full Access: can add, change, delete or view any information in the application

Operational Access: can add, change, or view any information in the application with the exception of the Athlete Input Page, Admin Revenue Page, Admin Dashboard, the Pricing Table, the User Table, fields that control membership dates, renewal dates, free usage periods, or any other fields or displays that have anything to do with money.

Input Access: add or view only version of the Operational access

View Access: view only version of the Operational access.

Other Considerations: Except for the Full Access Administrator, no other type of user may access more than one College Times or Athlete Times record at a time. Except for the Full Access Administrator, there will be no way for any other type of user to report or extract records from the College Times or Athlete Times database (other than the standard views that are part of the application). If an admin user updates College Times, the process for updating the Coach Input and default values for "interest" and "close" times described in section III.A (Interface—College Times) will also be used.

ii. Search

Description: Provides the ability to perform a free form search on any field on any database or table.

Prototype Cross Reference: None

Key Characteristics: This function will allow administrative users to identify specific or unusual situations within the application. For example, administrators may need to search on the following types of questions:

Find any college records with missing coaches or coach email addresses

Find a specific member record and associated payments/credits

Find a specific athlete, college, high school or club data record

Find the email address of any high school member whose membership is up for renewal in the next month Other Considerations: The above list is only a small set of examples. This function should allow searches of any field in the application.

iii. Dashboard

Description: Provides the facility for a Full Access Administrative User (only) to view a variety of information related to usage of the application.

Prototype Cross Reference: Admin Dashboard—FIG. 18

Key Characteristics: There are three general sections to the dashboard:

1) Current and Historical Usage. This section summarizes the current and historical information for all sports, by sport or by sport/gender combination. There is an area that tracks number of coaches, athletes, and high schools/clubs that are members. Other areas track the geographic distribution of the same member categories, the conference coverage of college members, and the distribution of athlete by quality measure (see Admin Metadata Swimmer Quality with optional view by graduation year). There is also a section that tracks the count of new members over a specified time period by source (where did they hear about LookForIt—see Source in College Members Table).

2) Statistics. This section summarizes total users by type, total clicks, total searches, ranks athletes that meet the most college recruiting standards, ranks athletes that are on the most college watch lists, ranks colleges that are on the most athlete watch lists, etc.

3) Audit Trail. Maintains before and after images of all adds, changes and deletes to records within the application including the user ID of the person making the change and the date of the change. The audit trail will have a parameter that allows purging of data after an authorized administrator entered parameter of days.

Other Considerations: Except for the Full Access Administrator, no other type of user may access more than one College Times or Athlete Times record at a time. Except for the Full Access Administrator, there will be no way for any other type of user to report or extract records from the College Times or Athlete Times database (other than the standard views that are part of the application).

iv. Revenue

Description: Displays the monthly 1901 and annual 1902 revenue produced by each source of revenue (subscription and user revenue within member type) 1903. Also includes reporting of advertising revenue.

Prototype Cross Reference: Admin Revenue—FIG. 19

Key Characteristics: As each member/user is added/renewed/cancelled from the application, the appropriate revenue is spread over the remaining term and posted to current and future periods.

Other Considerations: The prototype example of this page shows the summary version of the display. There will also be a detail version of the page that shows the member by member detail (within State) of any cell in the spreadsheet (ie clicking on May College Coach Subscription Revenue should display every College/Sport/Gender name and amount that makes up the total, subtotaled by State).

e. Miscellaneous i. Splash Page

Description: The first page that will appear when a visitor arrives at www.LookForIt.com.

Prototype Cross Reference: Splash—FIG. 22

Key Characteristics: Information on the splash page is tailored to the type of user. Clicking on the Athlete section will bring the user to a page specialized to describe features of interest to athletes. Likewise, clicking on High Schools/Clubs or College Coaches will bring the user to a page specialized to describe features of interest to those users. Options will exist for users to register for the first time, login, or review information that describes the service. A demonstration of the software will be available from the splash page as well as a list of clients. Each of the users will be assigned a user name and password. There are three primary types of users each of which will have a different registration process (one for athletes, one for college coaches, and one for high school and club coaches). There will also be a facility for users to communicate suggestions for application improvement, links to useful information (NCAA rules), other athletic sites, and advertising panels.

Other Considerations: The splash page will have a background of swimming and track athletes along with college symbols (school names, mascots, logos, icons).

ii. Strength Rankings

Description: This page displays rankings of entities based upon the related athlete times within LookForIt.com. The top portion of the page contains overall strength rankings for athletes, high schools and clubs. The bottom portion optionally displays the rankings for a selected event. A parameter on the page determines the information to report as follows:

Region—Defaults to the state of the user. Can also contain a region (eg. Midwest), or Country (eg. US)

Graduation Class—Optional field that restricts results to only those swimmers that have a Graduation Year equal to the parameter. If left blank, all swimmers are included Event—Optional field. If selected, the bottom portion of the page will display rankings for this event. If left blank, this section of the page is not displayed.

Prototype Cross Reference: Strength Rankings—FIG. 20

Key Characteristics: Each of the section rankings is calculated as follows:

1) Athletes (Swimmers)—Athletes in this section are selected if their Graduation Year matches the optional parameter. If no parameter is entered, all athletes in the sport/gender are selected. A Preliminary Strength Index is calculated for each event by comparing the athlete's time with the Athlete Quality Table. The Quality from that table is used to look up the Strength Index associated in the Strength Index Point Table (see Admin Metadata). For swimmers, there are six freestyle events. Only the highest two Strength Index calculations are used for the Final Strength Index. The Final Strength Index for each swimmer is calculated as the highest two Strength Index calculations from the freestyle events plus the Strength Index calculations from each of the other events. In total, there are 10 events in the Final Strength Index calculation (two freestyle, two fly, two breast, two back, and two IM). Athletes are ranked from high to low with a scroll capability to display all in the category.

2) High Schools—Athletes in this section are selected if their Graduation Year implies they are still a high school athlete (ie if current date is February 2012 and athlete Graduation Year is 2012, 2013, 2014, or 2015, then select the athlete for potential inclusion). The Final Strength Index for the top 10 swimmers associated with each high school comprise the strength index for the high school. High Schools are ranked from high to low with a scroll capability to display all in the category.

3) Clubs—The Final Strength Index for the top 10 swimmers associated with each club comprise the strength index for the club. Clubs are ranked from high to low with a scroll capability to display all in the category.

4) Athlete Event—Athletes in this section are selected if their Graduation Year matches the optional parameter. If selected, the event will be displayed in the heading of this section. Athletes are ranked by event time from fastest to slowest.

5) High School Event—Athletes in this section are selected if their Graduation Year implies they are still a high school athlete (ie if current date is February 2012 and athlete Graduation Year is 2012, 2013, 2014, or 2015, then select the athlete for potential inclusion). If selected, the Final Strength Index for the top 10 swimmers associated with each high school in this event comprise the strength index for the high school event. High Schools are ranked from high to low with a scroll capability to display all in the category.

6) Club Event—If selected, the Final Strength Index for the top 10 swimmers associated with each club in this event comprise the strength index for the high school event. Clubs are ranked from high to low with a scroll capability to display all in the category.

Other Considerations: A search facility will exist so that the user can find a particular athlete, high school or club. Athlete strength index values are stored on the Athlete Member Table and updated as times are updated.

iii. Membership Renewal/Cancellation

Description: Periodic process to renew or cancel a membership to the application.

Prototype Cross Reference: None

Key Characteristics: Coach, High School and Club memberships are automatically renewed unless cancelled by the member. Elite Athlete memberships are automatically renewed unless there has been no activity on the account in the past renewal period (6 months), in which a message will be emailed to the athlete indicating that the membership will be cancelled within 7 days unless renewed by the athlete. When a renewal date arrives for a member, the credit card information on file is charged with the amount of the subscription in the Pricing Table and the Renewal Date is updated to reflect the next renewal date. The revenue is also spread and posted over the term on the Admin Revenue page. If the credit card information is not accepted, an email is sent to the member and a message posted on their splash page indicating they should update their credit card information and the Renewal Date is temporarily extended seven days to allow access while the member updated the credit card information. A reminder email and message on the splash page is sent after three calendar days if not updated. The reminder email will indicate that the member's subscription will be suspended if the credit card information is not posted within seven calendar days from the original renewal date. If the credit card information is not posted within seven calendar days from the original renewal date, the Renewal Date is moved back to the original Renewal Date (seven days earlier) which restricts access by this member. If the credit card information of an elite member is not posted within seven calendar days from the original renewal date, the membership is converted back to a standard membership and access is denied to elite pages.

If a member cancels their membership, a credit for the remaining term is processed on the credit card on file and the revenue is reversed over the remaining term in the Admin Revenue page. If the credit card information is not accepted, an email is sent to the member and a message posted on their splash page indicating they should update their credit card information. A reminder email and message on the splash page is sent after three calendar days if not updated. If the credit card information is not posted within seven calendar days from the original date of cancellation, an email is sent to the member and a message posted on their splash page that a cancellation was attempted but failed due to incorrect credit card information.

Other Considerations: Users will have a capability to cancel their membership at any time through one of the input pages. Users will also have the ability to update their credit card information through one of the input pages.

iv. Research Center

Description: For each division, provides links to useful information related to each sport and being a college athlete in general.

Prototype Cross Reference: Research Center—FIG. 21

Key Characteristics: Each division has a section in the research center that contains links to eligibility requirements 2101, useful information for college-bound athletes 2102, the list of colleges that offer the sport in that division, and current rankings of the colleges in that division/sport 2103.

Other Considerations: An administrative user will have the ability to add or delete links on this page.

III. Interfaces a. Bulk Load of Excel Times

A significant number of event times have been stored in an Excel file for Women's swimming. An interface will be developed to load these times into the College Times Database. An edit will be performed to make sure that any time representing the $3^{rd}$ fastest time in an event will be equal to or slower than the time in the $2^{nd}$ fastest time in the same event. Likewise, the similar logic check will be performed to on the $2^{nd}$ and $1^{st}$ fastest times to make sure that there is consistency in the data prior to successful upload. For each college, an initial Coach Input record will be created that contains the times, the season of the times (eg 2010/2011), and sets initial default values for times that are of "interest" or "close" for the college. This is to help insure that some data is displayed on the Coach Dashboard when a college initially becomes a member. Default values to use for the "interest" column will equal the time appearing in time #3 of each event (or #2 if #3 is blank, or #1 if #2 is blank). Default values to use for the "close" column are as found on the Event Rules Table in the Default Close Coach column. The time in this table means that the time to set as the default time for the Coach Input record for each event will be the "interest" time plus the time in the Default Close Coach column. For example, if the "interest" time derived above for the 100 breaststroke is 1:05.50 and the time in the Default Close Coach column of the Event Rules Table is 0:02.00, then the time to be placed in the Coach Input record for "close" for the college would be 1:07.50. If there is no derived value for "interest" (ie #1, #2 and #3 times are blank), there will be no value for "close". No default value will be set for the "cutoff" time.

b. Advertising

A facility will exist to easily integrate advertising information supplied by third parties to the application. Advertising panels may appear on any page. Like athlete, club, coach, or high school membership tracking, a facility will also exist to track the name of the advertising company, the term of the ad and the cost of the ad. Upon posting the ad, the advertising revenue will be spread across the appropriate term in the Admin Revenue page.

IV. Files Overview

There will be three sets of each of these databases as follows:
Production—supports production operation of the application
Demo—supports demonstrations of the application using production programs but demonstration (non-live) data.
Test—supports testing of new versions of the application not yet moved to production with and without production data.
Primary files are as follows:
a. Times Databases
i. College Times
   For each sport/gender combination for a given season, this database stores the top three times for each event. Data in this file should be encrypted.
ii. Athlete Times
   For each athlete/sport combination, this database stores the top times for each event. For example, in swimming, the database will store the top current SCY and LCM time for each event, as well as the history of any previous times. Associated with each time is the date the time occurred. Data in this file should be encrypted.
b. Reference Databases
i. Event Rules
ii. Users
iii. College Members Data
iv. Athlete Members Data
v. High School Members Data
vi. Club Members Data
vii. Advertising Members Data
viii. Athlete Quality
ix. Conference Data
x. NCAA Cuts
xi. States that Comprise a Region
xii. Strength Index Points
xiii. Pricing
xiv. Credit Card Information
Data in this table should be encrypted.
xv. Audit Trail
All reference databases must have the ability for an authorized administrative user to update information (per security definitions defined in Admin—Input section).

V. Volume Considerations

The two primary databases in this application will have approximately the following characteristics:
Times Database
For each sport/gender combination, will contain about 550 records (one for each college) with up to 60 fields in each record, mostly containing event times. Initially, there will be a total of four sport/gender combinations (female swimming, male swimming, female track and male track). This file is generally static in size as the main variable to its size is the addition or deletion of colleges with a sport/gender combination (a rare event). Updates to this database may occur daily, but the volume will be relatively low.
Athlete Times
For each athlete, will contain about 70 fields containing mostly event times and associated dates. The number of time/date combinations will grow over time from the athlete updating the application with faster times (old and new times/dates are stored). On average during the membership life of an athlete (18 months), it is estimated that the initial number of fields could quadruple from storing faster times. Initially, there may be up to 25,000 athletes maintained. Updates to this database may occur daily, but the volume will be relatively low.

The remaining tables in the application (with the exception of the Audit Trail) have low volumes and are less frequently updated than the above two primary databases. They are also generally static in size, with the exception of the user and member tables which are variable based on the total number of registered users/members. The Audit Trail file is large and grows as a function of the number of adds, changes and deletes to any of the other files.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

What is claimed is:

1. An internet-implemented athletic data aggregation and analysis method, comprising:
    obtaining at a computer system having at least one computer processor first quantitative objective athletic performance data from a plurality of sources, wherein each entry in said first data is associated with an event in a sport and at least one of a plurality of college athletic teams;
    storing said first data in an electronic database connected to said computer system;
    receiving at said computer system second quantitative objective athletic performance data, wherein each entry in said second data is associated with an event in a sport and a pre-college athlete;
    comparing at least one entry in said second data, which is associated with a first event, to at least a portion of said first data which is associated with said first event using said at least one computer processor to determine a result set indicating where on each of a non-empty subset of said plurality of college athletic teams, if at all, said pre-college athlete would rank in said first event;
    generating an electronic display indicative of at least a portion of said result set; and
    transmitting said electronic display over said digital network to a user.

2. The method of claim 1, wherein each entry in said first data and said second data includes an elapsed time for the completion of said associated event.

3. The method of claim 2, wherein said result set includes a projected ranking for said pre-college athlete for each college athletic team in said subset and for said selected event indicating how many athletes on said college athletic team have one or more associated elapsed times, associated with said selected event, that are better than said at least one entry in said second data.

4. The method of claim 3, wherein said sport is swimming.

5. The method of claim 4, wherein said plurality of college athletic teams includes at least one NCAA Division I swim team.

6. The method of claim 5, wherein at least one entry in said first data is associated with an event selected from the group consisting of: the 50 yard or meter freestyle, 100 yard or meter freestyle, the 200 yard or meter freestyle, the 500 yard or 400 meter freestyle, the 1650 yard or 1500 meter freestyle, the 100 yard or meter butterfly, the 200 yard or meter butterfly, the 100 yard or meter backstroke, the 200 yard or meter backstroke, the 100 yard or meter breaststroke, the 200 yard or meter breaststroke, the 200 yard or meter individual medley, and the 400 yard or meter individual medley.

7. The method of claim 3, wherein said sport is track and field.

8. The method of claim 7, wherein said plurality of college athletic teams includes at least one NCAA Division I track and field team.

9. The method of claim 8, wherein at least one entry in said first data is associated with an event selected from the group consisting of: the 60 meter dash, the 60 meter hurdles, the 100 meter dash, the 100 meter hurdles, the 200 meter dash, the 400 meter dash, the 400 meter hurdles, the 800 meter run, the 1,500 meter run, the mile run, the two mile run, the 3,000 meter run, the 3,000 meter steeplechase, the 5,000 meter run, and the 10,000 meter run.

10. The method of claim 2, wherein a plurality of said entries in said first data are each associated with a date upon which said time for the completion of said associated event took place.

11. The method of claim 1, wherein each entry in said first data and said second data includes a distance achieved in said associated event.

12. The method of claim 11, wherein at least one entry in said first data is associated with an event selected from the group consisting of: the long jump, the pole vault, the high jump, the triple jump, the shot put, the discus throw, the hammer throw, the javelin throw.

13. The method of claim 1, wherein said second data includes at least one entry associated with said pre-college athlete and a second event in said sport which is different from said first event.

14. The method of claim 1, wherein said graphical display includes a color coded indicator of where on each of said subset of said plurality of college athletic teams, if at all, said pre-college athlete would rank in said first event.

15. The method of claim 14, wherein said graphical display is presented in a sortable tabular form.

16. The method of claim 1, wherein at least one of said plurality of sources is a website associated with at least one of a plurality of said college athletic teams.

17. The method of claim 1, wherein at least one of said plurality of sources is a second user who uploads the first data on behalf of one of said plurality of college athletic teams.

18. The method of claim 1, further comprising the steps of:
    receiving at said computer system third college preference data over a digital network, wherein said third data is associated with said pre-college athlete; and
    determining said subset of said plurality of college athletic teams based on said third data.

19. The method of claim 18, wherein said third data includes at least one item selected from the group consisting of: a selected geographic region, a selected college sports division, a selected college conference, a selected range of college undergraduate enrollment, and a selected sporting event.

20. An internet-implemented athletic data aggregation and analysis method, comprising:
    obtaining at a computer system having at least one computer processor first quantitative objective athletic performance time data from a plurality of sources, wherein each time entry in said first data is associated with an event in a sport and at least one of a plurality of college athletic teams, said first time data including, for each of said plurality of college athletic teams, a time entry for each of the top three college athletes in each event of said sport who participated on said team;

storing said first data in an electronic database connected to said computer system;

receiving at said computer system second quantitative objective athletic performance time data, wherein each time entry in said second data is associated with a selected event in a sport and a first pre-college athlete;

comparing at least one time entry in said second data, which is associated with a first event, to at least a portion of said first data which is associated with said first event using said at least one computer processor to determine a result set indicating where on each of a non-empty subset of said plurality of college athletic teams, if at all, said first pre-college athlete would rank in said first event;

generating a tabular electronic display including a color coded marker for at least one event in said sport and each college athletic team in said subset which is indicative of where said first pre-college athlete would rank on that team in said at least one event based on said result said; and transmitting said electronic display over said digital network to a user.

21. An internet-implemented athletic data aggregation and analysis method, comprising:

obtaining at a computer system having at least one computer processor first quantitative objective athletic performance time data from a plurality of sources, wherein each time entry in said first data is associated with a swimming event and at least one of a plurality of college swimming teams, said first time data including, for each of said plurality of college swimming teams, a time entry for each of the top three swimmers in each event of said sport who participated on said team;

storing said first data in an electronic database connected to said computer system;

receiving at said computer system second data comprising a second set of swim times, wherein each swim time in said second data is associated with a selected swimming event and a first pre-college athlete;

comparing at least one swim time in said second data, which is associated with a first swimming event, to at least a portion of the swimming times in said first data which are associated with said first swimming event using said at least one computer processor to determine a result set indicating where on each of said plurality of college swimming teams, if at all, said first pre-college athlete would rank in said first swimming event;

generating an electronic display indicative of at least a portion of said result said; and transmitting said electronic display over said digital network to a user.

22. The method of claim 21, further comprising the steps of:

receiving at said computer system third college preference data over a digital network, wherein said third data is associated with said first pre-college athlete and includes at least one criteria impacting the college choice of said first pre-college athlete; and determining said subset of said plurality of college athletic teams based on said third data.

23. The method of claim 22, wherein said third data includes at least one item selected from the group consisting of: a selected geographic region, selected college sports division, a selected college conference, a selected range of college undergraduate enrollment, and a selected sporting event.

* * * * *